(12) United States Patent
Idogawa et al.

(10) Patent No.: US 11,346,296 B2
(45) Date of Patent: May 31, 2022

(54) ENGINE DEVICE

(71) Applicant: TOYOTA JIDOSHA KABUSHIKI KAISHA, Aichi-ken (JP)

(72) Inventors: Masanao Idogawa, Nagoya (JP); Takahiro Uchida, Okazaki (JP); Masahiro Kachi, Nagakute (JP); Reiko Goh, Toyota (JP); Hirokatsu Yamamoto, Chita (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/242,304

(22) Filed: Apr. 28, 2021

(65) Prior Publication Data
US 2021/0340927 A1 Nov. 4, 2021

(30) Foreign Application Priority Data

Apr. 29, 2020 (JP) .............................. JP2020-079879

(51) Int. Cl.
*F02D 41/14* (2006.01)
*F02D 9/08* (2006.01)
(Continued)

(52) U.S. Cl.
CPC .......... *F02D 41/1454* (2013.01); *F02B 37/16* (2013.01); *F02D 9/08* (2013.01); *F02D 41/003* (2013.01); *F02D 41/0032* (2013.01); *F02D 41/0042* (2013.01); *F02D 41/1439* (2013.01); *F02D 41/2445* (2013.01); *F02D 41/2454* (2013.01); *F02D 41/38* (2013.01); *F02D 2041/389* (2013.01); *F02D 2200/04* (2013.01)

(58) Field of Classification Search
CPC ...... F02D 41/1454; F02D 9/08; F02D 41/003; F02D 41/0032; F02D 41/0042; F02D 41/1439; F02D 41/2445; F02D 41/2454; F02D 41/38; F02D 2041/389; F02D 2200/04; F02B 37/16
See application file for complete search history.

(56) References Cited

U.S. PATENT DOCUMENTS

| 5,005,550 A * | 4/1991 | Bugin, Jr. ............ F02M 25/089 123/520 |
| 2014/0196694 A1 * | 7/2014 | Euliss .................... F02M 25/08 123/520 |

(Continued)

FOREIGN PATENT DOCUMENTS

JP 201952561 A 4/2019

*Primary Examiner* — Audrey B. Walter
(74) *Attorney, Agent, or Firm* — Hauptman Ham, LLP

(57) ABSTRACT

Fuel injection control of an engine is executed by setting a required injection amount and an air-fuel ratio correction amount. When setting conditions are met, the air-fuel ratio correction amount is set for a corresponding region to which a current intake air amount or load ratio belongs among a plurality of regions into which the range of the intake air amount or the load ratio is divided such that a region of a larger intake air amount or a higher load ratio becomes wider than a region of a smaller intake air amount or a lower load ratio. When purge conditions are met, a purge control valve is controlled such that purge of supplying an evaporated fuel gas to an intake pipe is executed based on a required purge ratio.

8 Claims, 12 Drawing Sheets

(51) Int. Cl.
   *F02D 41/00*  (2006.01)
   *F02D 41/38*  (2006.01)
   *F02D 41/24*  (2006.01)
   *F02B 37/16*  (2006.01)

(56) References Cited

U.S. PATENT DOCUMENTS

| | | | |
|---|---|---|---|
| 2014/0345574 A1* | 11/2014 | Haefele | F02M 25/0836 |
| | | | 123/519 |
| 2015/0292421 A1* | 10/2015 | Pursifull | F02D 41/004 |
| | | | 123/518 |
| 2016/0369721 A1* | 12/2016 | Pursifull | F02D 41/004 |
| 2018/0087476 A1* | 3/2018 | Amemiya | F02M 25/0836 |
| 2018/0163646 A1* | 6/2018 | Tsutsumi | F02M 35/1038 |
| 2020/0025156 A1 | 1/2020 | Mizushima et al. | |
| 2020/0063672 A1* | 2/2020 | Wodausch | F02D 41/0045 |
| 2020/0095957 A1* | 3/2020 | Hashimoto | F02M 25/089 |
| 2020/0116108 A1* | 4/2020 | Akita | F02D 41/004 |
| 2020/0291902 A1* | 9/2020 | Lee | F02M 25/08 |
| 2021/0172410 A1* | 6/2021 | Kim | F02M 35/10255 |
| 2021/0180530 A1* | 6/2021 | Sasaki | F02D 41/0042 |

\* cited by examiner

US 11,346,296 B2

ENGINE DEVICE

CROSS-REFERENCE TO RELATED APPLICATION

This application claims priority to Japanese Patent Application No. 2020-079879 filed on Apr. 29, 2020, incorporated herein by reference in its entirety.

BACKGROUND

1. Technical Field

The present disclosure relates to an engine device.

2. Description of Related Art

An engine device of the type covered herein has been hitherto proposed that includes a first purge passage through which an evaporated fuel gas containing evaporated fuel is supplied for purging to an intake pipe of an engine, downstream of a throttle valve, and a second purge passage through which the evaporated fuel gas is supplied for purging to the intake pipe, upstream of a compressor of a turbocharger, by an ejector that generates a negative pressure using a supercharging pressure from the turbocharger (e.g., see Japanese Unexamined Patent Application Publication No. 2019-052561). In this engine device, a pressure inside the intake pipe, downstream of the throttle valve, and a pressure generated by the ejector are compared to detect through which of the first purge passage and the second purge passage purge is executed. When the passage through which purge is executed switches between the first purge passage and the second purge passage, control characteristics data used in controlling a purge control valve is switched between first control characteristics data suitable for the first purge passage and second control characteristics data suitable for the second purge passage.

SUMMARY

There are engine devices that execute fuel injection control of an engine with an air-fuel ratio correction amount related to deviation of an air-fuel ratio sensor mounted on an exhaust pipe of the engine taken into account, and that, when setting conditions are met, set (learn) the air-fuel ratio correction amount for a corresponding region to which a current intake air amount or load ratio of the engine belongs among a plurality of regions into which the range of the intake air amount or the load ratio of the engine is divided. In some such engine devices, the range of the intake air amount or the load ratio is divided such that a region of a larger intake air amount or a higher load ratio becomes wider than a region of a smaller intake air amount or a lower load ratio. In this case, using the same conditions as purge conditions for a region of a large intake air amount or a high load ratio and for a region of a small intake air amount or a low load ratio causes problems including the tendency of the air-fuel ratio of the engine to fluctuate in the region of a large intake air amount or a high load ratio.

An engine device of the present disclosure aims mainly to reduce the fluctuations in the air-fuel ratio of an engine.

The engine device of the present disclosure has adopted the following solutions to achieve this main aim.

The gist of the engine device of the present disclosure is as follows:

An engine device installed in a vehicle and including:
an engine that has a throttle valve disposed in an intake pipe and a fuel injection valve, and outputs power using fuel supplied from a fuel tank;
an air-fuel ratio sensor mounted on an exhaust pipe of the engine;
a turbocharger having a compressor disposed in the intake pipe, upstream of the throttle valve;
an evaporated fuel processing device having
 a supply passage that splits into a first purge passage and a second purge passage that are connected to the intake pipe, downstream of the throttle valve, and supplies the evaporated fuel gas containing evaporated fuel generated inside the fuel tank to the intake pipe,
 an ejector having an intake port connected to a circulation passage extending from the intake pipe, between the compressor and the throttle valve, an exhaust port connected to the intake pipe, upstream of the compressor, and a suction port connected to the second purge passage, and
 a purge control valve provided in the supply passage; and
a controller.

The controller executes fuel injection control of the engine by setting a required injection amount using a required load ratio of the engine and an air-fuel ratio correction amount that is related to deviation of the air-fuel ratio sensor.

When setting conditions are met, the controller sets the air-fuel ratio correction amount for a corresponding region to which a current intake air amount or load ratio of the engine belongs among a plurality of regions into which the range of the intake air amount or the load ratio of the engine is divided such that a region of a larger intake air amount or a higher load ratio becomes wider than a region of a smaller intake air amount or a lower load ratio.

When purge conditions are met, the controller controls the purge control valve by setting a driving duty of the purge control valve such that purge of supplying the evaporated fuel gas to the intake pipe is executed based on a required purge ratio.

In a natural aspiration region, the purge conditions include a condition that there is a setting history of the air-fuel ratio correction amount for the corresponding region, and in a supercharging region, the purge conditions include a condition that the air-fuel ratio correction amount for the corresponding region has been set in a current trip.

In the engine device of the present disclosure, the fuel injection control of the engine is executed by setting the required injection amount using the required load ratio of the engine and the air-fuel ratio correction amount related to deviation of the air-fuel ratio sensor. When the setting conditions are met, the air-fuel ratio correction amount is set for the corresponding region to which the current intake air amount or load ratio of the engine belongs among the regions into which the range of the intake air amount or the load ratio of the engine is divided such that a region of a larger intake air amount or a higher load ratio becomes wider than a region of a smaller intake air amount or a lower load ratio. Further, when the purge conditions are met, the purge control valve is controlled by setting the driving duty of the purge control valve such that purge of supplying the evaporated fuel gas to the intake pipe is executed based on the required purge ratio. In the natural aspiration region, the purge conditions include the condition that there is a setting history of the air-fuel ratio correction amount for the corresponding region, and in the supercharging region, the purge conditions include the condition that the air-fuel ratio correction amount for the corresponding region has been set in a current trip. This means that, in the supercharging region (a region of a large intake air amount or a high load ratio), more stringent purge conditions are used than in the natural aspiration region (a region of a small intake air amount or a low load ratio). Thus, fluctuations in the air-fuel ratio of the engine in the supercharging region can be reduced.

In the engine device of the present disclosure, the controller may execute the fuel injection control by setting the required injection amount using the required load ratio, the air-fuel ratio correction amount, and a purge correction amount that is based on a purge concentration-related value related to the concentration of the evaporated fuel gas. When the purge is being executed, the controller may set the purge concentration-related value based on deviation of an air-fuel ratio detected by the air-fuel ratio sensor from a required air-fuel ratio. In this case, in the supercharging region, the accuracy (reliability) of the air-fuel ratio correction amount is lower and therefore the accuracy (reliability) of the purge concentration-related value is lower than those in the natural aspiration region. Using more stringent purge conditions in the supercharging region than in the natural aspiration region can avoid making the accuracy of the purge concentration-related value even lower.

In the engine device of the present disclosure, in the natural aspiration region, the purge conditions may include a condition that the temperature of the engine is not lower than a first predetermined temperature, and in the supercharging region, the purge conditions may include a condition that the temperature of the engine is not lower than a second predetermined temperature that is higher than the first predetermined temperature. In this case, in the natural aspiration region, the purge conditions may include conditions that the temperature of the engine is lower than the first predetermined temperature and that an integrated value of the intake air amount is not smaller than a predetermined air amount. Thus, using a more stringent condition for the engine temperature among the purge conditions in the supercharging region than in the natural aspiration region can reduce the fluctuations in the air-fuel ratio of the engine.

In the engine device of the present disclosure, the fuel injection valve may be a cylinder injection valve mounted on a combustion chamber of the engine. In the natural aspiration region, the purge conditions may include a condition that the pressure of fuel supplied by the cylinder injection valve is not lower than a first predetermined fuel pressure, and in the supercharging region, the purge conditions may include a condition that the supplied fuel pressure is not lower than a second predetermined fuel pressure that is higher than the first predetermined fuel pressure. Thus, using a more stringent condition for the supplied fuel pressure among the purge conditions in the supercharging region than in the natural aspiration region can reduce deposits adhering to the cylinder injection valve.

In the engine device of the present disclosure, the turbocharger may have a blow-off valve provided in a bypass pipe that connects two points in the intake pipe, upstream and downstream of the compressor, to each other, and in the supercharging region, the purge conditions may include a condition that the blow-off valve is closed. This can reduce the likelihood that in the supercharging region, part of the evaporated fuel gas supplied to the intake pipe, upstream of the compressor, through the second purge passage and the ejector may circulate through the bypass pipe.

In the engine device of the present disclosure, the controller may perform an inference process in which, when a post-throttle-valve pressure that is a pressure inside the intake pipe, downstream of the throttle valve, is lower than a threshold value, the controller infers that the purge does not include second purge of supplying the evaporated fuel gas to the intake pipe through the second purge passage, and when the post-throttle-valve pressure is not lower than the threshold value, the controller infers that the purge includes the second purge, and in this inference process, when the post-throttle-valve pressure equal to or higher than the threshold value falls below the threshold value, the controller may continue to infer that the purge includes the second purge until a predetermined time elapses. When the purge is being executed, the controller may estimate an ejector relative pressure that is a pressure at the suction port of the ejector, based on a pressure difference between a supercharging pressure that is a pressure inside the intake pipe, between the compressor and the throttle valve, and a pre-compressor pressure that is a pressure inside the intake pipe, upstream of the compressor, and on the driving duty, and then based on the ejector relative pressure and the post-throttle-valve pressure, determine a dominant purge that is a dominant one of the first purge and the second purge. When the purge is started or resumed, the controller may determine which of the natural aspiration region and the supercharging region applies based on an inference of whether the purge includes the second purge, and when the purge is being executed, the controller may determine which of the natural aspiration region and the supercharging region applies based on the dominant purge. Thus, which of the natural aspiration region and the supercharging region applies can be determined based on the inference of whether the purge includes the second purge and on the dominant purge.

In this case, the controller may determine the dominant purge based on the ejector relative pressure and a value that is the post-throttle-valve pressure allowing for an offset amount based on the cross-sectional area of the second purge passage relative to the cross-sectional area of the first purge passage. Thus, the dominant purge can be determined more appropriately than when the offset amount based on the cross-sectional area of the second purge passage relative to the cross-sectional area of the first purge passage is not allowed for. Here, the "cross-sectional area" may represented by a pipe diameter.

In this case, the controller may set the offset amount such that the absolute value of the offset amount as a negative value is larger when the absolute value of the post-throttle-valve pressure as a negative value is larger. This is based on the fact that the larger the absolute value of the post-throttle-valve pressure as a negative value is, the greater the influence of the cross-sectional area of the second purge passage relative to the cross-sectional area of the first purge passage is.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Next, a mode for carrying out the present disclosure will be described using an embodiment.

Figure 1:
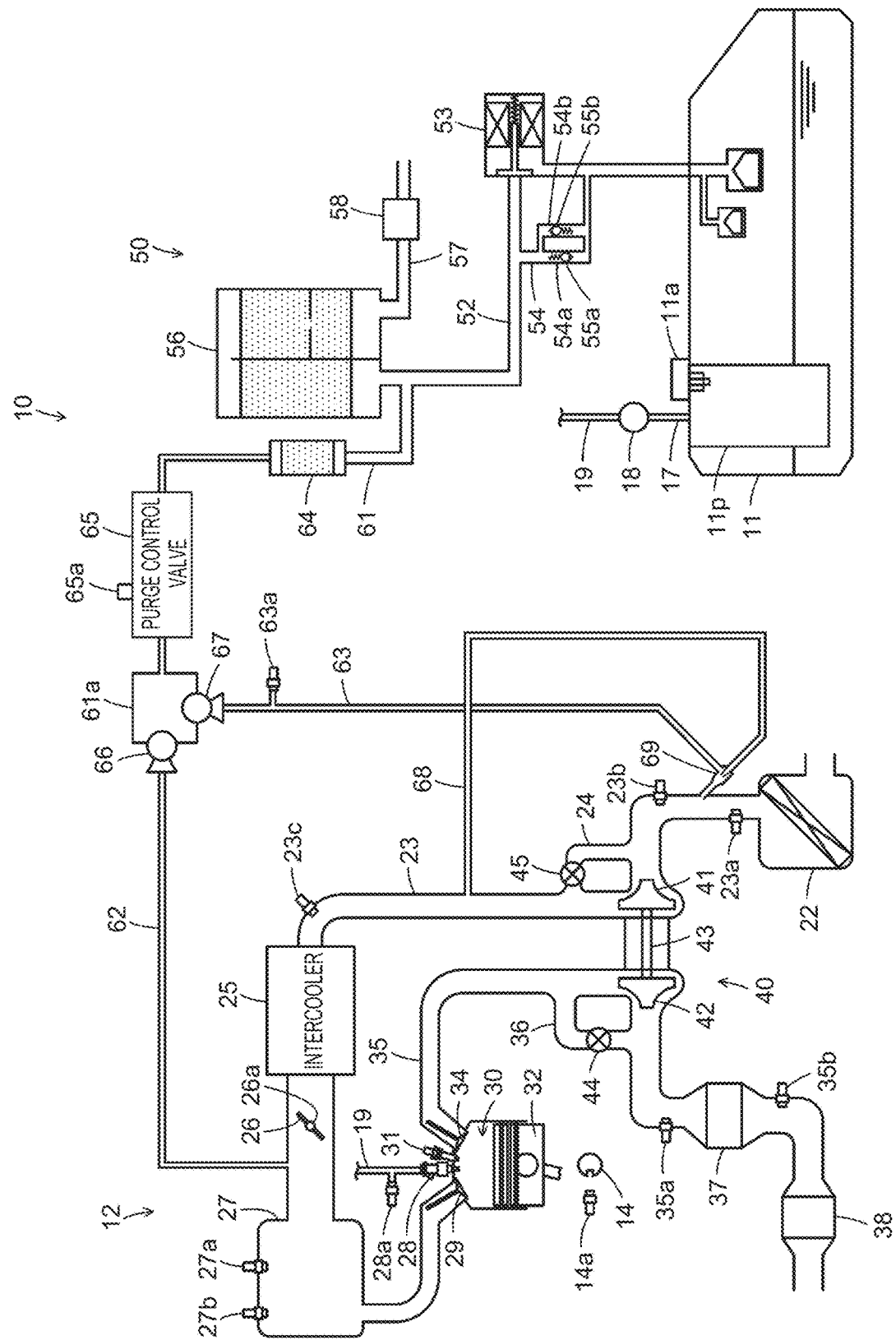
FIG. 1 is a configuration diagram showing an overview of the configuration of an engine device 10 of the present disclosure.
Figure 2:
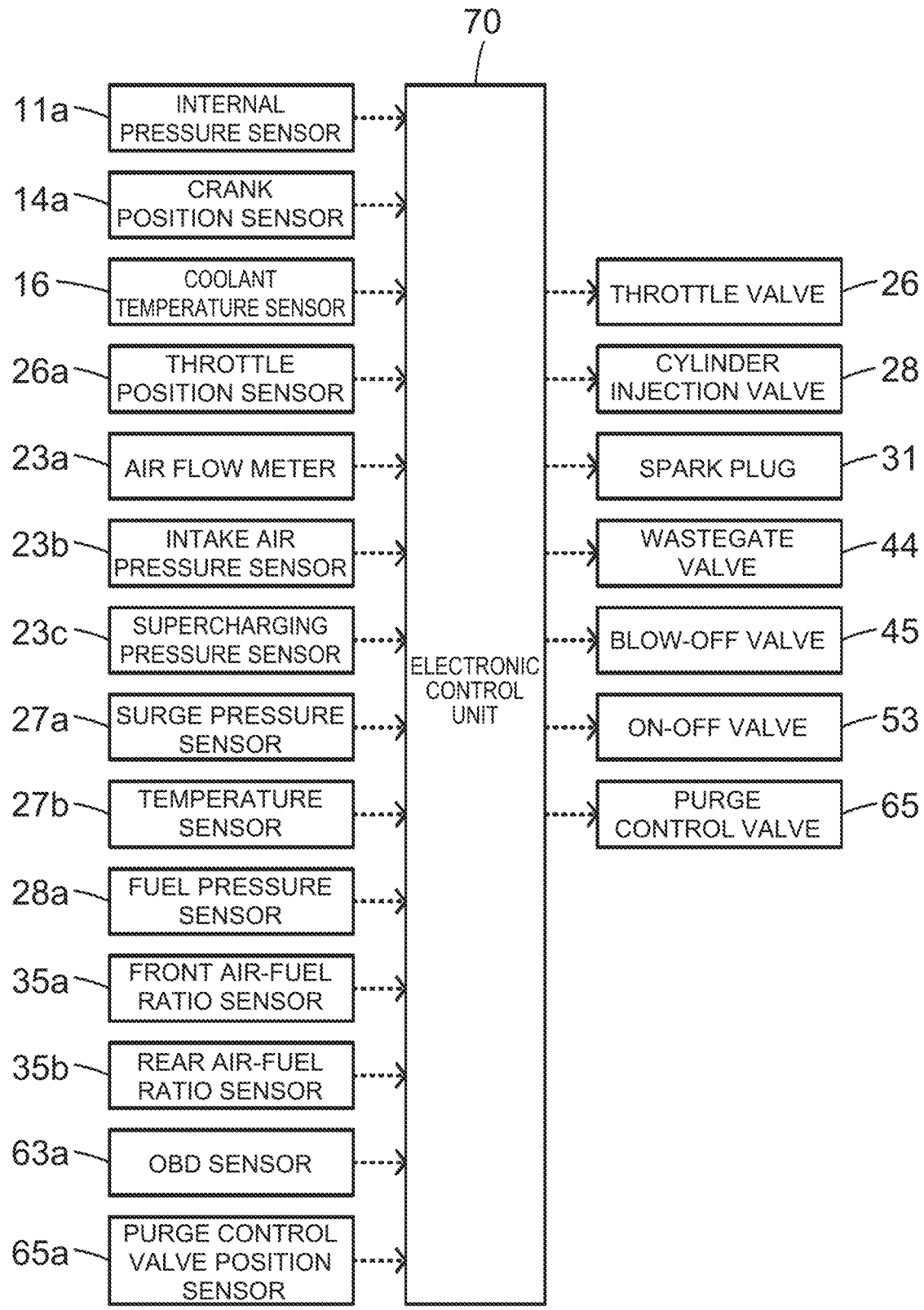
FIG. 2 is a chart showing examples of input and output signals of an electronic control unit 70.

FIG. 1 is a configuration diagram showing an overview of the configuration of an engine device 10 as one embodiment of the present disclosure, and FIG. 2 is a chart showing examples of input and output signals of an electronic control unit 70. The engine device 10 of the embodiment is installed in ordinary vehicles or various types of hybrid vehicles and, as shown in FIG. 1 and FIG. 2, includes an engine 12, a turbocharger 40, an evaporated fuel processing device 50, and the electronic control unit 70.

The engine 12 is configured as an internal combustion engine that outputs power using fuel, such as gasoline or light oil, supplied from a fuel tank 11. In the engine 12, air cleaned by an air cleaner 22 is taken into an intake pipe 23 and passed through an intercooler 25, a throttle valve 26, and a surge tank 27 in this order. Then, fuel is injected from a cylinder injection valve 28 mounted on a combustion chamber 30 into the air taken into the combustion chamber 30 through an intake valve 29 to mix the air and the fuel, and electric sparks are generated by a spark plug 31 to cause explosive combustion of this air-fuel mixture. The engine 12 converts reciprocating motion of a piston 32 that is pressed down by the energy of this explosive combustion into rotary motion of a crankshaft 14. Exhaust gas discharged from the combustion chamber 30 to an exhaust pipe 35 through an exhaust valve 34 is discharged into outside air through exhaust gas control apparatuses 37, 38 having a catalyst (three-way catalyst) that removes harmful components such as carbon monoxide (CO), hydrocarbon (HC), and nitrogen oxide (NOx). Fuel is supplied from the fuel tank 11 to the cylinder injection valve 28 through a feed pump 11p, a low-pressure-side fuel passage 17, a high-pressure pump 18, and a high-pressure-side fuel passage 19. The high-pressure pump 18 is driven by power from the engine 12 to pressurize the fuel in the low-pressure-side fuel passage 17 and supply the pressurized fuel to the high-pressure-side fuel passage 19.

The turbocharger 40 is configured as a turbocharger including a compressor 41, a turbine 42, a rotating shaft 43, a wastegate valve 44, and a blow-off valve 45. The compressor 41 is disposed in the intake pipe 23, upstream of the intercooler 25. The turbine 42 is disposed in the exhaust pipe 35, upstream of the exhaust gas control apparatus 37. The rotating shaft 43 couples the compressor 41 and the turbine 42 to each other. The wastegate valve 44 is provided in a bypass pipe 36 that connects two points in the exhaust pipe 35, upstream and downstream of the turbine 42, to each other, and is controlled by the electronic control unit 70. The blow-off valve 45 is provided in a bypass pipe 24 that connects two points in the intake pipe 23, upstream and downstream of the compressor 41, to each other, and is controlled by the electronic control unit 70.

In the turbocharger 40, the opening degree of the wastegate valve 44 is adjusted to thereby adjust a distribution ratio between an amount of exhaust gas flowing through the bypass pipe 36 and an amount of exhaust gas flowing through the turbine 42, adjust a rotational driving force of the turbine 42, adjust an amount of air compressed by the compressor 41, and adjust a supercharging pressure (intake pressure) of the engine 12. Specifically, the distribution ratio is adjusted such that, when the opening degree of the wastegate valve 44 is smaller, a smaller amount of exhaust gas flows through the bypass pipe 36 and a larger amount of exhaust gas flows through the turbine 42. When the wastegate valve 44 is fully open, the engine 12 can operate in the same manner as a natural aspiration engine that does not include the turbocharger 40.

In the turbocharger 40, when the pressure inside the intake pipe 23, downstream of the compressor 41, is to some extent higher than the pressure upstream thereof, opening the blow-off valve 45 can release an excessive pressure downstream of the compressor 41. Instead of being a valve controlled by the electronic control unit 70, the blow-off valve 45 may be configured as a check valve that opens when the pressure inside the intake pipe 23, downstream of the compressor 41, becomes to some extent higher than the pressure upstream thereof.

The evaporated fuel processing device 50 is a device that performs purge of supplying an evaporated fuel gas (purge gas) generated inside the fuel tank 11 to the intake pipe 23 of the engine 12, and includes an introduction passage 52, an on-off valve 53, a bypass passage 54, relief valves 55a, 55b, a canister 56, a common passage 61, a first purge passage 62, a second purge passage 63, a buffer part 64, a purge control valve 65, check valves 66, 67, a circulation passage 68, and an ejector 69. The introduction passage 52 and the common passage 61 correspond to the "supply passage" in the embodiment.

The introduction passage 52 is connected to the fuel tank 11 and the canister 56. The on-off valve 53 is provided in the introduction passage 52 and configured as a normally closed solenoid valve. The on-off valve 53 is controlled by the electronic control unit 70.

The bypass passage 54 connects two points in the introduction passage 52, on the side of the fuel tank 11 and on the side of the canister 56 relative to the on-off valve 53, to each other, and has two branch parts 54a, 54b into which the bypass passage 54 splits and which merge again into the bypass passage 54. The relief valve 55a is provided in the branch part 54a and configured as a check valve, and opens when the pressure on the side of the fuel tank 11 becomes to some extent higher than the pressure on the side of the canister 56. The relief valve 55b is provided in the branch part 54b and configured as a check valve, and opens when the pressure on the side of the canister 56 becomes to some extent higher than the pressure on the side of the fuel tank 11.

The canister 56 is connected to the introduction passage 52 and opens to the atmosphere through an atmospheric release passage 57. An inside of the canister 56 is filled with an adsorbent, such as active carbon, that can adsorb evaporated fuel from the fuel tank 11. The atmospheric release passage 57 is provided with an air filter 58.

The common passage 61 is connected to the introduction passage 52, near the canister 56, and splits at a split point 61a into the first purge passage 62 and the second purge passage 63. The first purge passage 62 is connected to the intake pipe 23, between the throttle valve 26 and the surge tank 27. The second purge passage 63 is connected to a suction port of the ejector 69.

The buffer part 64 is provided in the common passage 61. An inside of the buffer part 64 is filled with an adsorbent, such as active carbon, that can adsorb evaporated fuel from the fuel tank 11 and the canister 56. The purge control valve 65 is provided in the common passage 61, on the side of the split point 61a relative to the buffer part 64. The purge control valve 65 is configured as a normally closed solenoid valve. The purge control valve 65 is controlled by the electronic control unit 70.

The check valve 66 is provided in the first purge passage 62, near the split point 61a. The check valve 66 allows the evaporated fuel gas (purge gas) containing evaporated fuel to flow in a direction from the common passage 61 toward the first purge passage 62 (intake pipe 23), and prohibits the evaporated fuel gas from flowing in the opposite direction. The check valve 67 is provided in the second purge passage 63, near the split point 61a. The check valve 67 allows the evaporated fuel gas to flow in a direction from the common passage 61 toward the second purge passage 63 (ejector 69), and prohibits the evaporated fuel gas from flowing in the opposite direction.

The circulation passage 68 is connected to the intake pipe 23, between the compressor 41 and the intercooler 25, and to an intake port of the ejector 69. The ejector 69 has the intake port, the suction port, and an exhaust port. The ejector 69 has the intake port connected to the circulation passage 68, the suction port connected to the second purge passage 63, and the exhaust port connected to the intake pipe 23, upstream of the compressor 41. A leading end part of the intake port has a tapered shape.

When the turbocharger 40 is operating (when the pressure inside the intake pipe 23, between the compressor 41 and the intercooler 25, is a positive pressure), a pressure difference occurs between the intake port and the exhaust port of the ejector 69, and circulating intake air (intake air that is circulated from the intake pipe 23, downstream of the compressor 41, through the circulation passage 68) flows from the intake port toward the exhaust port. As the circulating intake air is depressurized at the leading end part of the intake port, a negative pressure occurs around the leading end part. This negative pressure causes the evaporated fuel gas to be suctioned from the second purge passage 63 through the suction port, and this evaporated fuel gas is supplied, along with the circulating intake air having a negative pressure, to the intake pipe 23, upstream of the compressor 41, through the exhaust port.

The evaporated fuel processing device 50 thus configured operates basically as follows: When the pressure inside the intake pipe 23, downstream of the throttle valve 26 (a surge pressure Ps to be describe later), is a negative pressure and the on-off valve 53 and the purge control valve 65 are open, the check valve 66 opens, so that the evaporated fuel gas (purge gas) generated inside the fuel tank 11 and the evaporated fuel gas desorbed from the canister 56 are supplied to the intake pipe 23, downstream of the throttle valve 26, through the introduction passage 52, the common passage 61, and the first purge passage 62. Hereinafter, this action will be referred to as "downstream purge." In this case, when the pressure inside the intake pipe 23, between the compressor 41 and the intercooler 25 (a supercharging pressure Pc to be described later), is a negative pressure or zero, the ejector 69 does not operate and the check valve 66 does not open.

When the pressure inside the intake pipe 23, between the compressor 41 and the intercooler 25 (supercharging pressure Pc), is a positive pressure and the on-off valve 53 and the purge control valve 65 are open, the ejector 69 operates and the check valve 67 opens, so that the evaporated fuel gas is supplied to the intake pipe 23, upstream of the compressor 41, through the introduction passage 52, the common passage 61, the second purge passage 63, and the ejector 69. Hereinafter, this action will be referred to as "upstream purge." In this case, the check valve 66 opens or closes according to the pressure inside the intake pipe 23, downstream of the throttle valve 26 (surge pressure Ps).

Thus, in the evaporated fuel processing device 50, of the two types of purge, only the downstream purge or the upstream purge is performed, or both the downstream purge and the upstream purge are performed, according to the pressure inside the intake pipe 23, downstream of the throttle valve 26 (surge pressure Ps), and the pressure inside the intake pipe 23, between the compressor 41 and the intercooler 25 (supercharging pressure Pc).

The electronic control unit 70 is configured as a microprocessor centered around a CPU, and includes, in addition to the CPU, an ROM that stores processing programs, an RAM that temporarily stores data, a non-volatile flash memory that stores and retains data, input and output ports, and a communication port. Signals from various sensors are input into the electronic control unit 70 through the input port.

Examples of the signals input into the electronic control unit 70 include a tank internal pressure Ptnk from an internal pressure sensor 11a that detects the pressure inside the fuel tank 11, a crank angle $\theta$cr from a crank position sensor 14a that detects the rotation position of the crankshaft 14 of the engine 12, a coolant temperature Tw from a coolant temperature sensor 16 that detects the temperature of a coolant in the engine 12, and a throttle valve opening degree TH from a throttle position sensor 26a that detects the opening degree of the throttle valve 26. Another example is a cam position $\theta$ca from a cam position sensor (not shown) that detects the rotation position of an intake cam shaft that opens and closes the intake valve 29 or an exhaust cam shaft that opens and closes the exhaust valve 34. Further examples are an intake air amount Qa from an air flow meter 23a mounted on the intake pipe 23, upstream of the compressor 41, an intake air pressure (pre-compressor pressure) Pin from an intake air pressure sensor 23b mounted on the intake pipe 23, upstream of the compressor 41, and the supercharging pressure Pc from a supercharging pressure sensor 23c mounted on the intake pipe 23, between the compressor 41 and the intercooler 25. Further examples are the surge pressure (post-throttle-valve pressure) Ps from a surge pressure sensor 27a mounted on the surge tank 27, and a surge temperature Ts from a temperature sensor 27b mounted on the surge tank 27. Another example is a supplied fuel pressure Pfd from a fuel pressure sensor 28a that detects the fuel pressure of the fuel supplied to the cylinder injection valve 28. Further examples are a front air-fuel ratio AF1 from a front air-fuel ratio sensor 35a mounted on the exhaust pipe 35, upstream of the exhaust gas control apparatus 37, and a rear air-fuel ratio AF2 from a rear air-fuel ratio sensor 35b mounted on the exhaust pipe 35, between the exhaust gas control apparatus 37 and the exhaust gas control apparatus 38. Further examples are an opening degree Opv of the purge control valve 65 from a purge control valve position sensor 65a, and a sensor signal Pobd from an OBD sensor (pressure sensor) 63a mounted in the second purge passage 63.

Various control signals are output from the electronic control unit 70 through the output port. Examples of the signals output from the electronic control unit 70 include a control signal to the throttle valve 26, a control signal to the cylinder injection valve 28, and a control signal to the spark plug 31. Further examples are a control signal to the wastegate valve 44, a control signal to the blow-off valve 45, and a control signal to the on-off valve 53. Another example is a control signal to the purge control valve 65.

The electronic control unit 70 calculates a speed Ne and a load ratio (a ratio of a volume of air actually taken in during one cycle of the engine 12 relative to a stroke volume per cycle) KL of the engine 12. The speed Ne is calculated based on the crank angle $\theta cr$ from the crank position sensor 14a. The load ratio KL is calculated based on the intake air amount Qa from the air flow meter 23a and the speed Ne.

In the engine device 10 of the embodiment thus configured, intake air amount control of controlling the opening degree of the throttle valve 26, fuel injection control of controlling an amount of fuel injected from the cylinder injection valve 28, spark control of controlling an ignition timing of the spark plug 31, supercharging control of controlling the opening degree of the wastegate valve 44, purge control of controlling the opening degree of the purge control valve 65, and other types of control are performed by the electronic control unit 70 based on a required load ratio KL* of the engine 12. In the following, the fuel injection control and the purge control will be described. Since the intake air amount control, the spark control, and the supercharging control do not constitute main subjects of the present disclosure, a detailed description thereof will be omitted.

Figure 3:
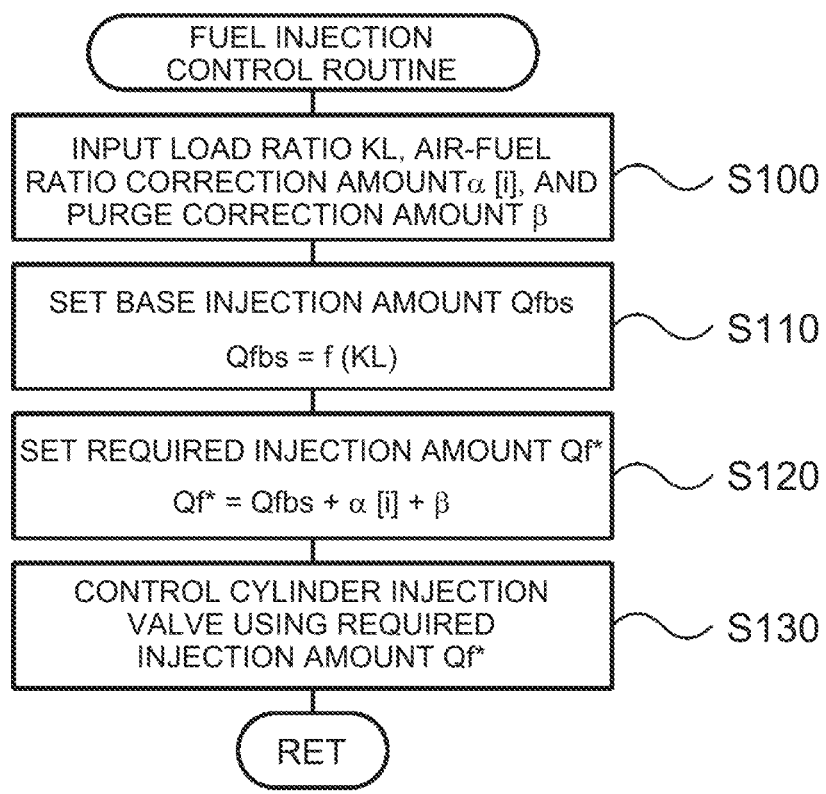
FIG. 3 is a flowchart showing one example of a fuel injection control routine.

The fuel injection control will be described. FIG. 3 is a flowchart showing one example of a fuel injection control routine. This routine is repeatedly executed by the electronic control unit 70. When this routine is executed, the electronic control unit 70 inputs data including the load ratio KL of the engine 12, an air-fuel ratio correction amount $\alpha$ [i], and a purge correction amount $\beta$ (step S100).

Figure 4:
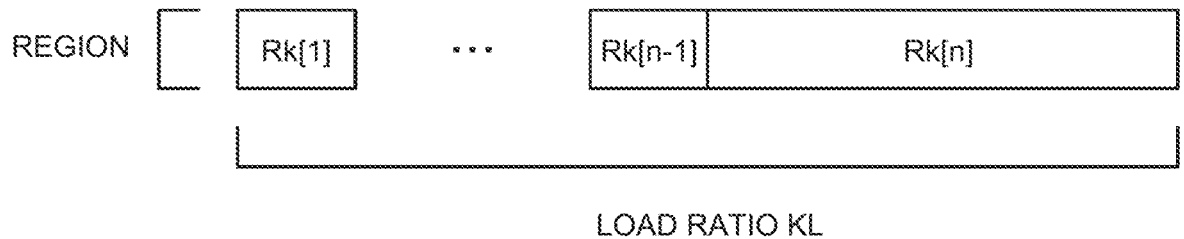
FIG. 4 is a chart showing one example of a plurality of load ratio regions Rk [1] to Rk [n]

As the load ratio KL of the engine 12, a value calculated based on the intake air amount Qa and the speed Ne is input. The air-fuel ratio correction amount $\alpha$ [i] is a correction amount related to deviation (offset amount) of the front air-fuel ratio sensor 35a for a corresponding region (a region number i (i: one of 1 to n)) to which the current load ratio KL belongs among a plurality of load ratio regions Rk [1] to Rk [n] (n: a total number of regions) into which the range of the load ratio KL is divided, and a value set by an air-fuel ratio correction amount setting routine, to be described later, is input as the air-fuel ratio correction amount $\alpha$ [i]. FIG. 4 is a chart showing one example of the load ratio regions Rk [1] to Rk [n]. As shown in this chart, in the embodiment, the load ratio regions Rk [1] to Rk [n] are set by dividing a range assumed for the load ratio KL into load ratio regions Rk [1], . . . , Rk [n] in increasing order of the load ratio KL such that the load ratio region Rk [n] of the highest load ratio becomes wider (covers a wider range of the load ratio KL) than the other load ratio regions Rk [1] to Rk [n−1]. The purge correction amount $\beta$ is a correction amount related to the downstream purge and the upstream purge described above, and a value set by a purge correction amount setting routine, to be described later, is input as the purge correction amount $\beta$.

Subsequently, the electronic control unit 70 sets a base injection amount Qfbs of the cylinder injection valve 28 based on the load ratio KL (step S110), sets a required injection amount Qf* of the cylinder injection valve 28 by adding the air-fuel ratio correction amount $\alpha$ and the purge correction amount $\beta$ to the set base injection amount Qfbs (step S120), controls the cylinder injection valve 28 using the set required injection amount Qf* (step S130), and ends this routine. The base injection amount Qfbs is a base value of the required injection amount Qf* for the cylinder injection valve 28 that is required for the air-fuel ratio of the air-fuel mixture inside the combustion chamber 30 to meet a required air-fuel ratio AF*. For example, a value calculated as the product of the load ratio KL and a unit injection amount (an injection amount per 1% of the load ratio KL) Qfpu of the cylinder injection valve 28 required for the air-fuel ratio of the air-fuel mixture inside the combustion chamber 30 to meet the required air-fuel ratio AF* is set as the base injection amount Qfbs.

Next, a process of setting the air-fuel ratio correction amounts $\alpha$ [1] to $\alpha$ [n] for the respective load ratio regions Rk [1] to Rk [n] used in the fuel injection control routine of FIG. 3 will be described using the air-fuel ratio correction amount setting routine of FIG. 5. This routine is repeatedly executed by the electronic control unit 70. Until they are set in a current trip, the air-fuel ratio correction amounts $\alpha$ [1] to $\alpha$ [n] for the respective load ratio regions Rk [1] to Rk [n] have initial values or values that were set last time in the last trip or an earlier trip.

Figure 5:
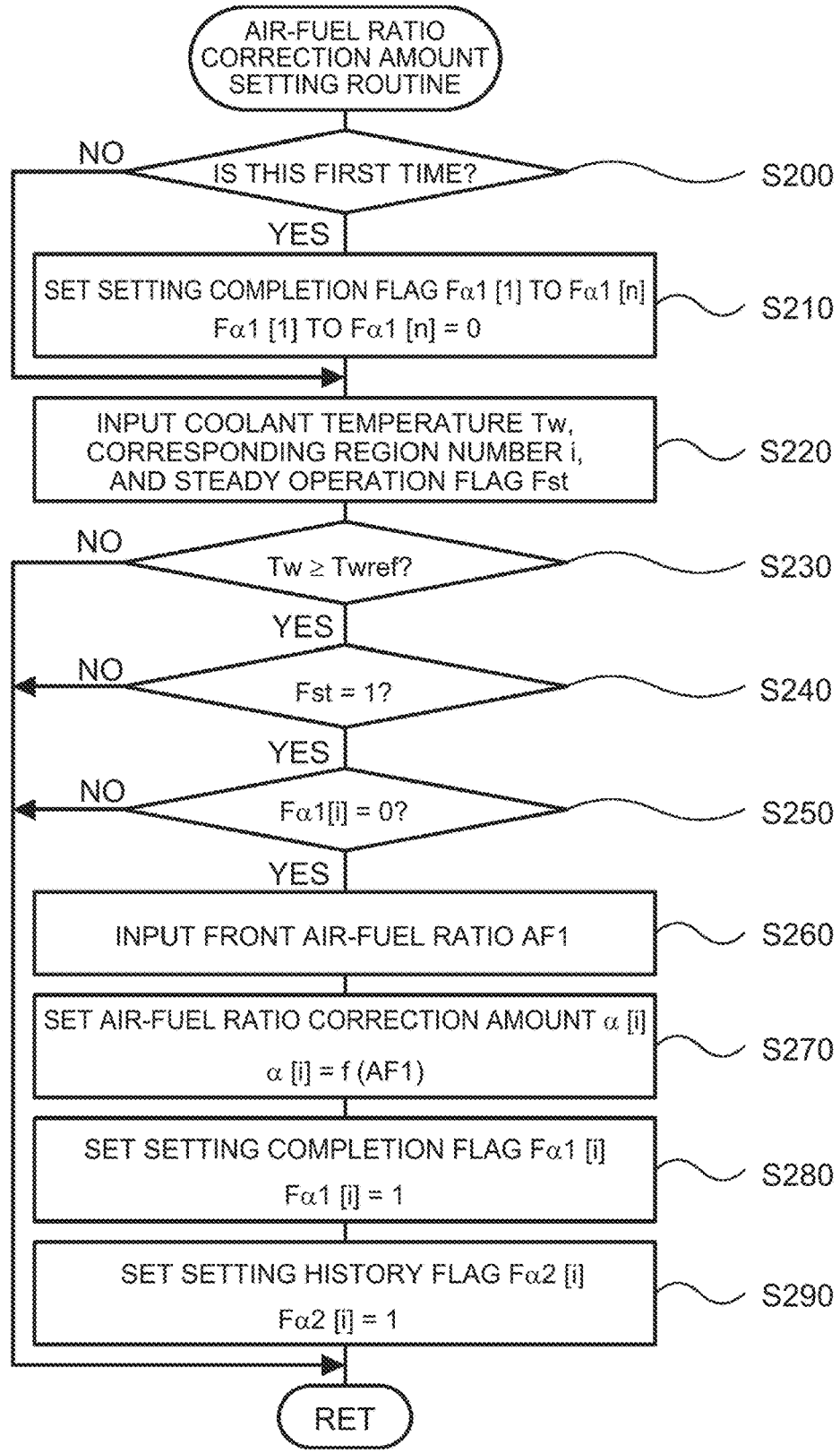
FIG. 5 is a flowchart showing one example of an air-fuel ratio correction amount setting routine.

When the air-fuel ratio correction amount setting routine of FIG. 5 is executed, the electronic control unit 70 first determines whether this is the first time the routine is executed in the current trip (step S200). When it is determined that this is the first time the routine is executed in the current trip, the electronic control unit 70 resets all of setting completion flags F$\alpha$1 [1] to F$\alpha$1 [n] for the load ratio regions Rk [1] to Rk [n] to zero as an initial value (step S210). The setting completion flags F$\alpha$1 [1] to F$\alpha$1 [n] are flags that respectively indicate whether the air-fuel ratio correction amounts $\alpha$ [1] to $\alpha$ [n] have been set in the current trip. When it is determined in step S200 that this is not the first time the routine is executed in the current trip, the electronic control unit 70 does not execute the process of step S210.

Subsequently, the electronic control unit 70 inputs data including the coolant temperature Tw of the engine 12, a steady operation flag Fst, and the corresponding region number i to which the current load ratio KL belongs among the load ratio regions Rk [1] to Rk [n] (step S220). As the coolant temperature Tw, a value detected by the coolant temperature sensor 16 is input. As the steady operation flag Fst, a value set by a steady operation flag setting routine (not shown) is input. In the steady operation flag setting routine, the electronic control unit 70 determines whether the engine 12 is in steady operation by using at least one of the speed Ne, the intake air amount Qa, and the load ratio KL of the engine 12. When it is determined that the engine 12 is in steady operation, the electronic control unit 70 sets the value of the steady operation flag Fst to one, and when it is determined that the engine 12 is not in steady operation, the electronic control unit 70 sets the value of the steady operation flag Fst to zero. As the region number i of the corresponding region, a value that is set based on the load ratio KL and the load ratio regions Rk [1] to Rk [n] is input.

Then, the electronic control unit 70 compares the coolant temperature Tw with a threshold value Twref (step S230), and checks the value of the steady operation flag Fst (step S240). As the threshold value Twref, for example, a temperature of about 55° C. to 65° C. is used. The processes of steps S230 and S240 are processes of determining whether conditions for setting the air-fuel ratio correction amount $\alpha$ [i] for the region number i are met. When the coolant temperature Tw is lower than the threshold value Twref in step S230 or when the value of the steady operation flag Fst is zero in step S240, the electronic control unit 70 determines that the conditions for setting the air-fuel ratio correction amount $\alpha$ [i] for the region number i are not met, and ends this routine.

When the coolant temperature Tw is not lower than the threshold value Twref in step S230 and the value of the steady operation flag Fst is one in step S240, the electronic control unit 70 determines that the conditions for setting the air-fuel ratio correction amount $\alpha$ [i] for the region number i are met, and checks the value of the setting completion flag F$\alpha$1 [i] for the region number i (step S250). When the value of the setting completion flag F$\alpha$1 for the region number i is zero, the electronic control unit 70 determines that the air-fuel ratio correction amount $\alpha$ [i] for the region number i has not been set in the current trip, and inputs the front air-fuel ratio AF1 (step S260). Then, the electronic control unit 70 sets the air-fuel ratio correction amount $\alpha$ [i] for the region number i based on the input front air-fuel ratio AF1 (step S270), sets the value of the setting completion flag F$\alpha$1 [i] for the region number i to one (step S280), sets the value of a setting history flag F$\alpha$2 [i] for the region number i to one (step S290), and ends this routine. Setting history flags F$\alpha$2 [1] to F$\alpha$2 [n] are flags that respectively indicate whether there is a setting history for the air-fuel ratio correction amounts $\alpha$ [1] to $\alpha$ [n]. When maintenance etc. is performed before shipment from the factory or at a dealer, the values of the setting history flags F$\alpha$2 [1] to F$\alpha$2 [n] are set to zero as an initial value.

Figure 6:
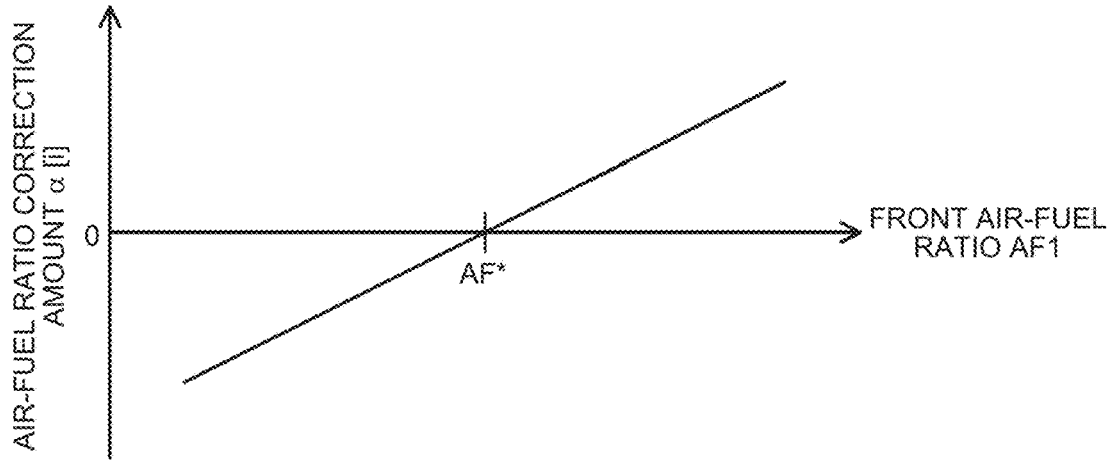
FIG. 6 is a graph showing one example of an air-fuel ratio correction amount setting map.

As the front air-fuel ratio AF1, a value detected by the front air-fuel ratio sensor 35a is input. The air-fuel ratio correction amount $\alpha$ [i] for the region number i can be obtained by applying the front air-fuel ratio AF1 at the point when the conditions for setting the air-fuel ratio correction amount $\alpha$ [i] are met to an air-fuel ratio correction amount setting map. The air-fuel ratio correction amount setting map is specified in advance by experiment or analysis as a relationship between the front air-fuel ratio AF1 at the point when the conditions for setting the air-fuel ratio correction amount $\alpha$ [i] for the region number i are met and the air-fuel ratio correction amount $\alpha$ [i], and is stored in the ROM or the flash memory (not shown). FIG. 6 is a graph showing one example of the air-fuel ratio correction amount setting map. As shown in this graph, the air-fuel ratio correction amount $\alpha$ [i] is set within a negative range and a positive range corresponding to the front air-fuel ratio AF1 at the point when the setting conditions are met being on a rich side and a lean side, respectively, relative to the required air-fuel ration AF*, and is set such that the absolute value of the air-fuel ratio correction amount $\alpha$ [i] increases as the difference between the front air-fuel ratio AF1 and the required air-fuel ratio AF* increases (as the front air-fuel ratio AF1 deviates farther from the required air-fuel ratio AF*). When the air-fuel ratio correction amount $\alpha$ [i] is smaller, the cylinder injection valve 28 is controlled in the fuel injection control routine of FIG. 3 with a smaller required injection amount Qf*. Since the load ratio regions Rk [1] to Rk [n] are set as described above such that the load ratio region Rk [n] of the highest load ratio becomes wider than the other load ratio regions Rk [1] to Rk [n−1] (see FIG. 4), the reliability of the air-fuel ratio correction amount $\alpha$ [n] for the load ratio region Rk [n] is lower than the reliabilities of the air-fuel ratio correction amount $\alpha$ [1] to $\alpha$ [n−1] for the other load ratio regions Rk [1] to Rk [n−1].

When the value of the setting completion flag F$\alpha$1 [i] for the region number i is one in step S250, the electronic control unit 70 determines that the air-fuel ratio correction amount $\alpha$ [i] for the region number i has been set in the current trip, and ends this routine without executing the processes of steps S260 to S290.

Figure 7:
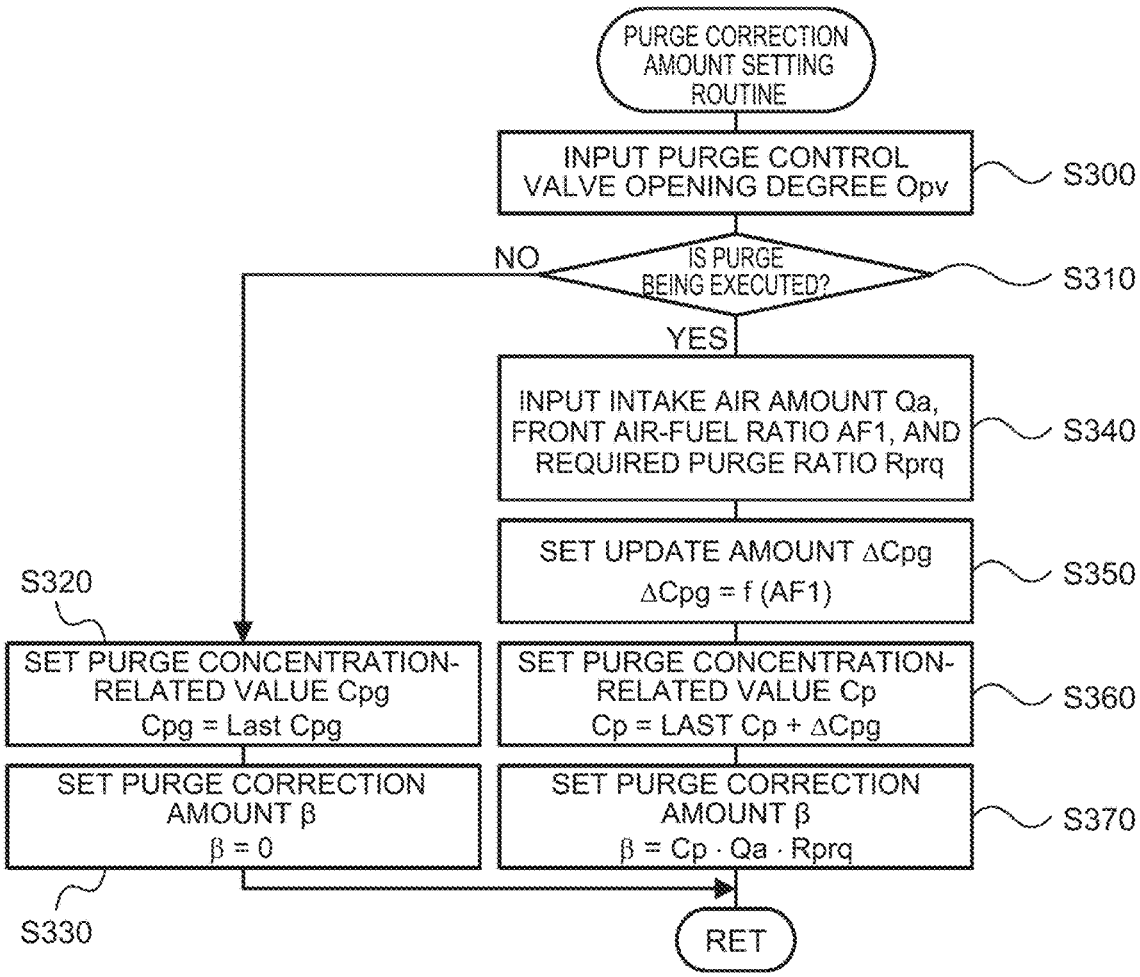
FIG. 7 is a flowchart showing one example of a purge correction amount setting routine.

Next, a process of setting the purge correction amount $\beta$ used in the fuel injection amount control routine of FIG. 3 will be described using the purge correction amount setting routine of FIG. 7. This routine is repeatedly executed by the electronic control unit 70. When this routine is started, the electronic control unit 70 first inputs the opening degree Opv of the purge control valve 65 (step S300), and using the input opening degree Opv of the purge control valve 65, determines whether the purge is being executed (step S310). As the opening degree Opv of the purge control valve 65, a value detected by the purge control valve position sensor 65a is input.

When it is determined that the purge is not being executed in step S310, the electronic control unit 70 retains the purge concentration-related value Cp (step S320), sets the value of the purge correction amount $\beta$ to zero (step S330), and ends this routine. The purge concentration-related value Cp is a correction factor related to deviation of the air-fuel ratio inside the combustion chamber 30 per 1% of the purge ratio. The purge concentration-related value Cp is set to zero as an initial value when the purge is started for the first time in each trip. The "purge concentration" means the concentration of the evaporated fuel in the evaporated fuel gas, and the "purge ratio" means the ratio of the evaporated fuel gas to the intake air amount.

When it is determined in step S310 that the purge is being executed, the electronic control unit 70 inputs data including the intake air amount Qa, the front air-fuel ratio AF1, and the required purge ratio Rprq (step S340). As the intake air amount Qa, a value detected by the air flow meter 23a is input. As the front air-fuel ratio AF1, a value detected by the front air-fuel ratio sensor 35a is input. As the required purge ratio Rprq, a value set by a purge control routine, to be described later, is input. When purge conditions, to be described later, are not met, the value of the required purge ratio Rprq is set to zero.

Figure 8:
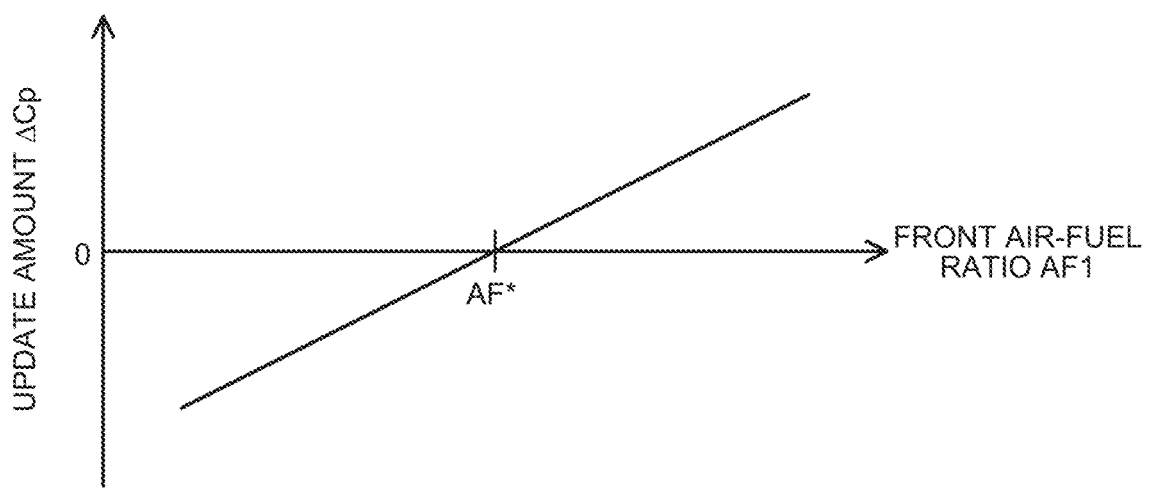
FIG. 8 is a graph showing one example of an update amount setting map.

Subsequently, the electronic control unit 70 sets an update amount $\Delta$Cp of the purge concentration-related value Cp based on the front air-fuel ratio AF1 (step S350), and sets a value obtained by adding the update amount $\Delta$Cp to the last purge concentration-related value (last Cp) as the purge concentration-related value Cp (step S360). The update amount $\Delta$Cp can be obtained by applying the front air-fuel ratio AF1 to an update amount setting map. The update amount setting map is specified in advance by experiment or analysis as a relationship between the front air-fuel ratio AF1 and the update amount ΔCp, and is stored in the ROM or the flash memory (not shown). FIG. 8 is a graph showing one example of the update amount setting map. As shown in this graph, the update amount ΔCp is set within a negative range and a positive range corresponding to the front air-fuel ratio AF1 being on the rich side and the lean side, respectively, relative to the required air-fuel ratio AF*, and is set such that the absolute value of the update amount ΔCp increases as the difference between the front air-fuel ratio AF1 and the required air-fuel ratio AF* increases (as the front air-fuel ratio AF1 deviates farther from the required air-fuel ratio AF*). When the purge concentration-related value Cp thus set is a negative value, this means that the gas passing through the purge control valve 65 contains evaporated fuel, and when the purge concentration-related value Cp is not smaller than zero, this means that the gas passing through the purge control valve 65 does not contain evaporated fuel. The purge concentration-related value Cp becomes relatively small (the absolute value thereof becomes large as a negative value) when the purge concentration is high, for example, immediately after start of the first purge in a trip or immediately after resumption of the purge, i.e., when the front air-fuel ratio AF1 is likely to be rich relative to the required air-fuel ratio AF*. Thereafter, the purge concentration-related value Cp increases gradually as the purge continues and the purge concentration decreases.

The electronic control unit 70 sets the product of the purge concentration-related value Cp, the intake air amount Qa, and the required purge ratio Rprq as the purge correction amount β (step S370) and ends this routine. The purge correction amount β thus set has a negative value when the purge concentration-related value Cp is a negative value, and the absolute value of the purge correction amount β increases as the absolute value of the purge concentration-related value Cp increases and as the intake air amount Qa and the required purge ratio Rprq increase. When the purge concentration-related value Cp is zero, the purge correction amount β is zero. Further, when the purge concentration-related value Cp is a positive value, the purge correction amount β is a positive value, and the absolute value of the purge correction amount β increases as the absolute value of the purge concentration-related value Cp increases and as the intake air amount Qa and the required purge ratio Rprq increase. When the purge correction amount β is smaller, the cylinder injection valve 28 is controlled in the fuel injection control routine of FIG. 3 with a smaller required injection amount Qf*.

Figure 9:
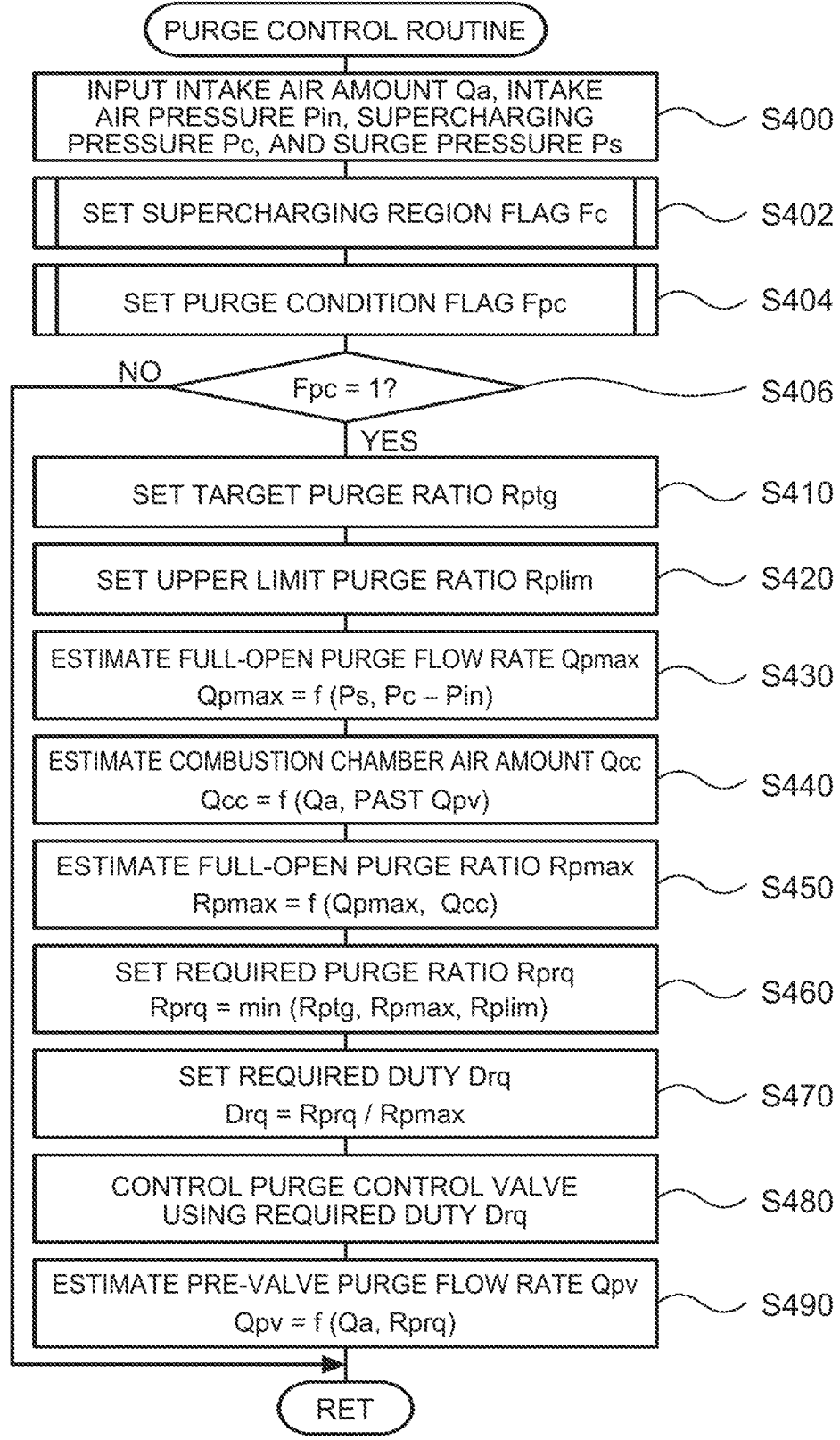
FIG. 9 is a flowchart showing one example of purge control routine.
Figure 10:
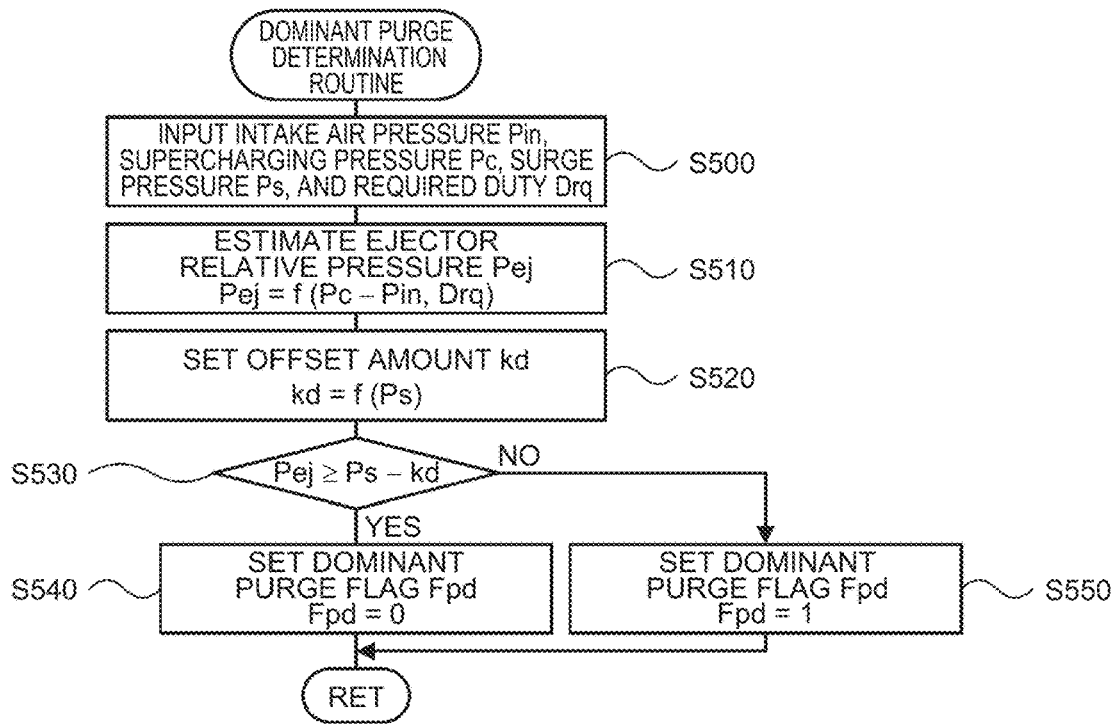
FIG. 10 is a flowchart showing one example of a dominant purge determination routine.
Figure 11:
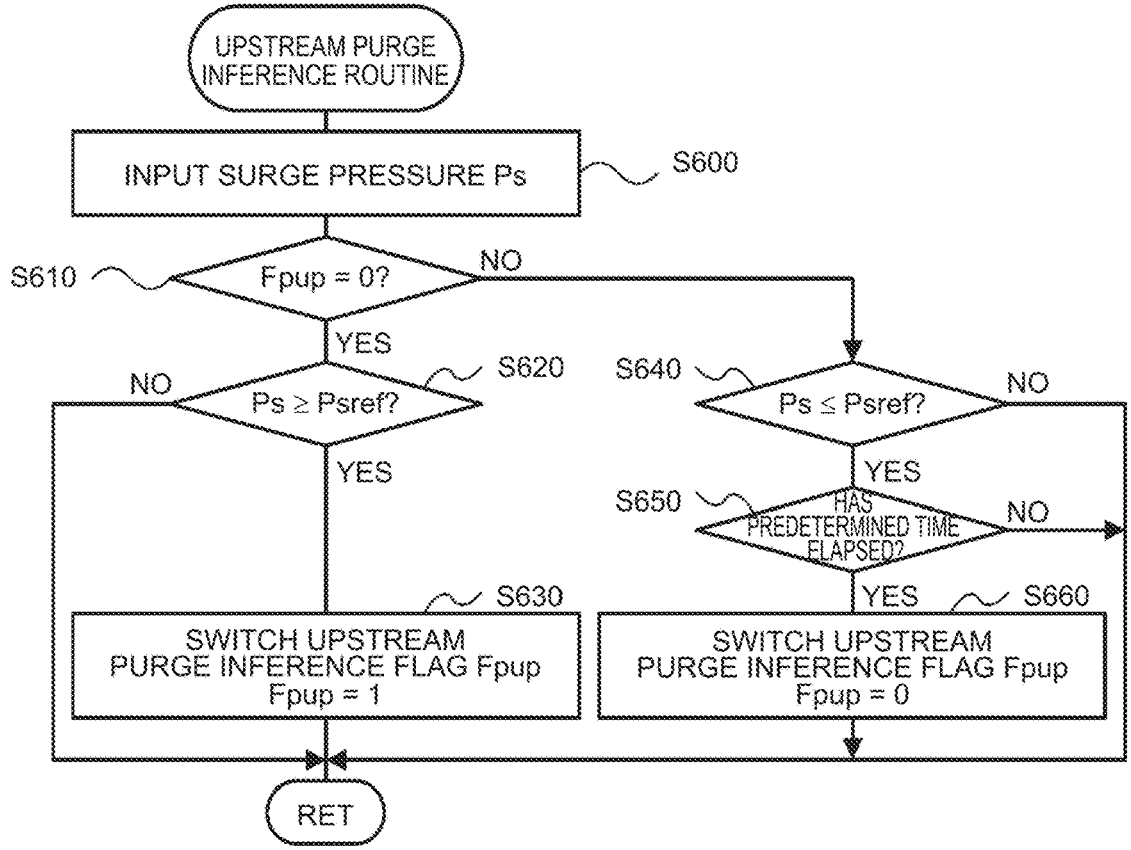
FIG. 11 is a flowchart showing one example of an upstream purge inference routine.

Next, the purge control will be described. FIG. 9 is a flowchart showing one example of a purge control routine. FIG. 10 is a flowchart showing one example of a dominant purge determination routine for determining a dominant purge that is a dominant one of the downstream purge and the upstream purge. FIG. 11 is a flowchart showing one example of an upstream purge inference routine for inferring whether the purge includes the upstream purge (or consists only of the downstream purge). That the purge includes the upstream purge means that at least part of the evaporated fuel gas supplied to the combustion chamber 30 is the evaporated fuel gas that is supplied through the second purge passage 63.

The purge control routine of FIG. 9 and the upstream purge inference routine of FIG. 11 are repeatedly executed by the electronic control unit 70. The dominant purge determination routine of FIG. 10 is repeatedly executed by the electronic control unit 70 when the purge is being executed (when the purge control valve 65 is being controlled by setting the required duty Drq in the purge control routine of FIG. 9). In the following, for the convenience of description, the dominant purge determination will be described using the dominant purge determination routine of FIG. 10, and inference of whether the purge includes the upstream purge (or consists only of the downstream purge) will be described using the upstream purge inference routine of FIG. 11, and then the purge control based on these determination and inference will be described using the purge control routine of FIG. 9.

When the dominant purge determination routine of FIG. 10 is executed, the electronic control unit 70 first inputs data including the intake air pressure Pin, the supercharging pressure Pc, the surge pressure Ps, and the required duty Drq (step S500). As the intake air pressure Pin, a value detected by the intake air pressure sensor 23b is input. As the supercharging pressure Pc, a value detected by the supercharging pressure sensor 23c is input. As the surge pressure Ps, a value detected by the surge pressure sensor 27a is input. As the required duty Drq, a value set by the purge control routine of FIG. 9 is input.

Figure 12:
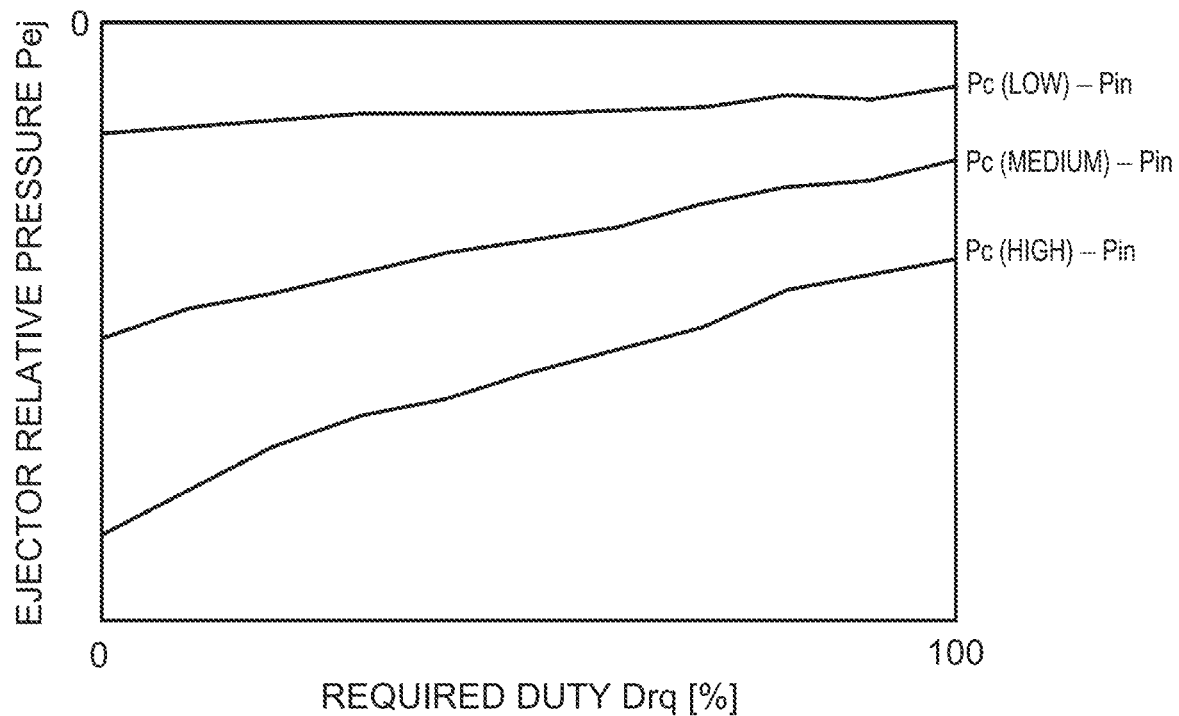
FIG. 12 is a graph showing one example of an ejector relative pressure setting map.

When the data is thus input, the electronic control unit 70 estimates the ejector relative pressure Pej based on a value obtained by subtracting the intake air pressure Pin from the supercharging pressure Pc and on the required duty Drq (step S510). The ejector relative pressure Pej can be obtained by applying the value obtained by subtracting the intake air pressure Pin from the supercharging pressure Pc and the required duty Drq to an ejector relative pressure setting map. The ejector relative pressure setting map is specified in advance by experiment or analysis as a relationship among the value obtained by subtracting the intake air pressure Pin from the supercharging pressure Pc, the required duty Drq, and the ejector relative pressure Pej, and is stored in the ROM or the flash memory (not shown). FIG. 12 is a graph showing one example of the ejector relative pressure setting map. As shown in this graph, the ejector relative pressure Pej is set such that the ejector relative pressure Pej increases (the absolute value thereof as a negative value decreases) as the required duty Drq increases, and decreases (the absolute value thereof as a negative value increases) as the supercharging pressure Pc (the value obtained by subtracting the intake air pressure Pin from the supercharging pressure Pc) increases.

Figure 13:
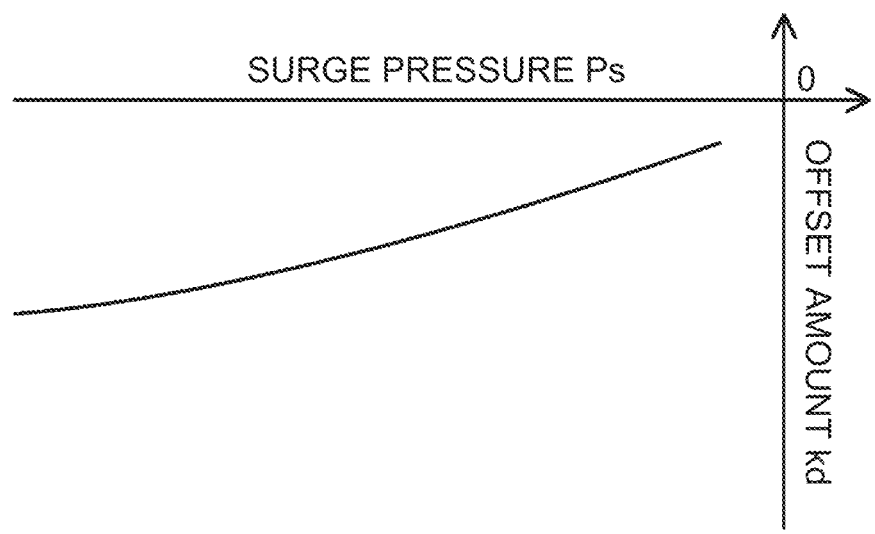
FIG. 13 is a graph showing one example of an offset amount setting map in a case where the cross-sectional area of a second purge passage 63 is smaller than the cross-sectional area of a first purge passage 62.

Subsequently, based on the surge pressure Ps, the electronic control unit 70 sets the offset amount kd by which the surge pressure Ps is offset to correct the influence based on the cross-sectional area of the second purge passage 63 relative to the cross-sectional area of the first purge passage 62 (step S520). The offset amount kd can be obtained by applying the surge pressure Ps to an offset amount setting map. The offset amount setting map is specified in advance by experiment or analysis as a relationship between the surge pressure Ps and the offset amount kd and stored in the ROM or the flash memory (not shown). FIG. 13 is a graph showing one example of the offset amount setting map in a case where the cross-sectional area of the second purge passage 63 is smaller than the cross-sectional area of the first purge passage 62. As shown in this graph, the offset amount kd is set such that the absolute value thereof as a negative value increases as the absolute value of the surge pressure Ps as a negative value increases. This is based on the fact that the larger the absolute value of the surge pressure Ps as a negative value is, the greater the influence based on the cross-sectional area of the second purge passage 63 relative to the cross-sectional area of the first purge passage 62 is.

When the first purge passage 62 and the second purge passage 63 are formed by pipes, since the cross-sectional area is proportional to the square of the pipe diameter, the influence based on the cross-sectional area of the second purge passage 63 relative to the cross-sectional area of the first purge passage 62 can be rephrased as the influence based on the pipe diameter of the second purge passage relative to the pipe diameter of the first purge passage 62.

Then, the electronic control unit 70 compares the ejector relative pressure Pej and a value obtained by subtracting the offset amount kd from the surge pressure Ps (step S530). When it is determined that the ejector relative pressure Pej is not smaller (the absolute value thereof is not larger) than the value obtained by subtracting the offset amount kd from the surge pressure Ps, the electronic control unit 70 determines that the evaporated fuel gas flows dominantly through the first purge passage 62 (the downstream purge is the dominant purge), sets the value of the dominant purge flag Fpd to zero (step S540), and ends this routine.

When it is determined in step S530 that the ejector relative pressure Pej is lower (the absolute value thereof is larger) than the value obtained by subtracting the offset amount kd from the surge pressure Ps, the electronic control unit 70 determines that the evaporated fuel gas flows dominantly through the second purge passage 63 (the upstream purge is the dominant purge), sets the value of the dominant purge flag Fpd to one (step S550), and ends this routine.

Thus, in the embodiment, the offset amount kd for correcting the influence based on the cross-sectional area of the second purge passage relative to the cross-sectional area of the first purge passage 62 is set based on the surge pressure Ps, and it is determined which of the downstream purge and the upstream purge is the dominant purge by comparing the ejector relative pressure Pej and the value obtained by subtracting the offset amount kd from the surge pressure Ps. In this way, which of the downstream purge and the upstream purge is the dominant purge can be determined more appropriately than when the influence based on the cross-sectional area of the second purge passage relative to the cross-sectional area of the first purge passage 62 is not taken into account.

Next, the inference of whether the purge includes the upstream purge (or consists only of the downstream purge) will be described using the upstream purge inference routine of FIG. 11. When this routine is executed, the electronic control unit 70 first inputs the surge pressure Ps (step S600). As the surge pressure Ps, a value detected by the surge pressure sensor 27a is input.

Subsequently, the electronic control unit 70 checks the value of the upstream purge inference flag Fpup (step S610). The upstream purge inference flag Fpup is a flag that is set in this routine, and the value of this flag is set to one when it is inferred that the purge includes the upstream purge and set to zero when it is inferred that the purge does not include the upstream purge (consists only of the downstream purge). For example, when a trip is started, the value of the upstream purge inference flag Fpup is set to zero as an initial value. In the embodiment, this routine is repeatedly executed regardless of whether the purge conditions are met. Therefore, the value of the upstream purge inference flag Fpup when the purge is not being executed is a value based on the assumption that the purge is being executed.

When the value of the upstream purge inference flag Fpup is zero, i.e., when it is inferred that the purge does not include the upstream purge (consists only of the downstream purge), the electronic control unit 70 compares the surge pressure Ps and a threshold value Psref (step S620). The threshold value Psref is a threshold value used in inferring whether the purge includes the upstream purge, and is specified in advance by experiment or analysis. For example, a value of about −6 kPa to −9 kPa is used as the threshold value Psref.

When it is determined in step S620 that the surge pressure Ps is lower than the threshold value Psref, the electronic control unit 70 infers that the purge does not include the upstream purge, and ends this routine without switching the upstream purge inference flag Fpup (with the value thereof maintained at zero). When it is determined that the surge pressure Ps is not lower than the threshold value Psref, the electronic control unit 70 infers that the purge includes the upstream purge, and ends this routine after switching the value of the upstream purge inference flag Fpup to one (step S630).

When the value of the upstream purge inference flag Fpup is one in step S610, i.e., when it is inferred that the purge includes the upstream purge, the electronic control unit 70 compares the surge pressure Ps and the threshold value Psref (step S640). When it is determined that the surge pressure Ps is not lower than the threshold value Psref, the electronic control unit 70 infers that the purge includes the upstream purge, and ends this routine without switching the upstream purge inference flag Fpup (with the value thereof maintained at one).

When it is determined that the surge pressure Ps is lower than the threshold value Psref, the electronic control unit 70 determines whether a predetermined time T1 has elapsed since the surge pressure Ps has fallen below the threshold value Psref (step S650). When it is determined that the predetermined time T1 has not elapsed since the surge pressure Ps has fallen below the threshold value Psref, the electronic control unit 70 infers that the purge includes the upstream purge, and ends this routine without switching the upstream purge inference flag Fpup (with the value thereof maintained at one). When it is determined that the predetermined time T1 has elapsed since the surge pressure Ps has fallen below the threshold value Psref, the electronic control unit 70 infers that the purge does not include the upstream purge (consists only of the downstream purge), and ends this routine after switching the value of the upstream purge inference flag Fpup to zero (step S660).

Figure 14:
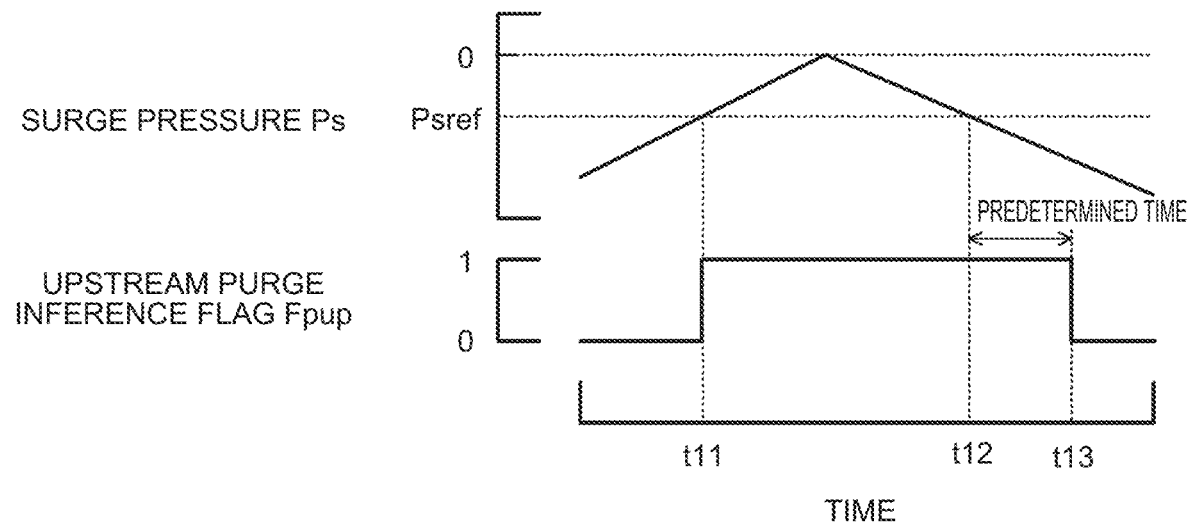
FIG. 14 is a graph showing one example of changes in a surge pressure Ps and an upstream purge inference flag Fpup.

FIG. 14 is a graph showing one example of changes in the surge pressure Ps and the upstream purge inference flag Fpup. As shown in this graph, when the value of the upstream purge inference flag Fpup is zero and the surge pressure Ps becomes equal to or higher than the threshold value Psref (time t11), the value of the upstream purge inference flag Fpup is switched to one. Thereafter, when the surge pressure Ps falls below the threshold value Psref (time t12) and the predetermined time T1 has elapsed with the surge pressure Ps lower than the threshold value Psref (time t13), the value of the upstream purge inference flag Fpup is switched to zero.

The predetermined time T1 is specified by experiment or analysis as a difference between a time taken for the evaporated fuel gas to reach the surge tank 27 (combustion chamber 30) during the upstream purge and a time taken for the evaporated fuel gas to reach the surge tank 27 (combustion chamber 30) during the downstream purge. Since the route by which the evaporated fuel gas reaches the surge tank 27 during the upstream purge is longer than the route by which the evaporated fuel gas reaches the surge tank 27 during the downstream purge, the time taken for the evaporated fuel gas to reach the surge tank 27 during the upstream purge is longer than the time taken for the evaporated fuel gas to reach the surge tank 27 during the downstream purge. It is therefore assumed that, when the surge pressure Ps equal to or higher than the threshold value Psref falls below the threshold value Psref, for some time (see time t12 to t13 in FIG. 14), the evaporated fuel gas remaining in the second purge passage 63 and the evaporated fuel gas newly supplied to the first purge passage 62 merge in the intake pipe 23, downstream of the throttle valve 26, and are supplied to the surge tank 27 (combustion chamber 30). In the embodiment, based on this assumption, when the value of the upstream purge inference flag Fpup is one, the electronic control unit 70 switches the value of the upstream purge inference flag Fpup to zero after waiting for the predetermined time T1 to elapse after the surge pressure Ps falls below the threshold value Psref. Thus, whether the purge includes the upstream purge (or consists only of the downstream purge) can be more appropriately inferred.

Next, the purge control will be described using the purge control routine of FIG. 9. When this routine is executed, the electronic control unit 70 first inputs data including the intake air amount Qa, the intake air pressure Pin, the supercharging pressure Pc, and the surge pressure Ps (step S400). As the intake air amount Qa, a value detected by the airflow meter 23a is input. As the intake air pressure Pin, a value detected by the intake air pressure sensor 23b is input. As the supercharging pressure Pc, a value detected by the supercharging pressure sensor 23c is input. As the surge pressure Ps, a value detected by the surge pressure sensor 27a is input.

Subsequently, the electronic control unit 70 sets the supercharging region flag Fc by a supercharging region determination routine to be described later (step S402), sets a purge condition flag Fpc based on the supercharging region flag Fc by a meeting of purge condition determination routine to be described later (step S404), and checks the set value of the purge condition flag Fpc (step S406). The value of the supercharging region flag Fc is set to zero when it is determined that the natural aspiration region applies, and is set to one when it is determined that the supercharging region applies. The value of the purge condition flag Fpc is set to one when it is determined that the purge conditions are met, and is set to zero when it is determined that the purge conditions are not met. For example, when a trip is started, the values of the supercharging region flag Fc and the purge condition flag Fpc are set to zero as an initial value. When the value of the purge condition flag Fpc is zero, i.e., when it is determined that the purge conditions are not met, the electronic control unit 70 ends this routine. In this case, the electronic control unit 70 sets the value of the required purge ratio Rprq to zero and closes the purge control valve 65 as described above.

When the value of the purge condition flag Fpc is one in step S406, i.e., when it is determined that the purge conditions are met, the electronic control unit 70 sets a target purge ratio Rptg (step S410). The target purge ratio Rptg is set so as to increase gradually from a starting purge ratio Rpst1 (e.g., by rate processing using a rate value ΔRp1) during a period in which the purge conditions are met for the first time (a period from start of meeting of the purge conditions until interruption or completion thereof) in each trip. Further, the target purge ratio Rptg is set so as to increase gradually from a resumed purge ratio Rpst2 (e.g., by rate processing using a rate value ΔRp2) during a period in which the purge conditions are met for the second time or a subsequent time (a period from resumption of meeting of the purge conditions until interruption or completion thereof) in each trip. To reduce the fluctuations in the air-fuel ratio of the engine 12, relatively small values are used as the starting purge ratio Rpst1 and the resumed purge ratio Rpst2. The value of at least one of the starting purge ratio Rpst1, the resumed purge ratio Rpst2, and the rate values ΔRp1, ΔRp2 is set to a smaller value when the value of the supercharging region flag Fc is one, i.e., when it is determined that the supercharging region applies, than when the value of the supercharging region flag Fc is zero, i.e., when it is determined that the natural aspiration region applies.

Subsequently, the electronic control unit 70 sets the upper limit purge ratio Rplim (step S420). In the embodiment, the value of the upper limit purge ratio Rplim is set to be smaller when the value of the supercharging flag Fc is one, i.e., when it is determined that the supercharging region applies, than when the value of the supercharging flag Fc is zero, i.e., when it is determined that the natural aspiration region applies.

Figure 15:
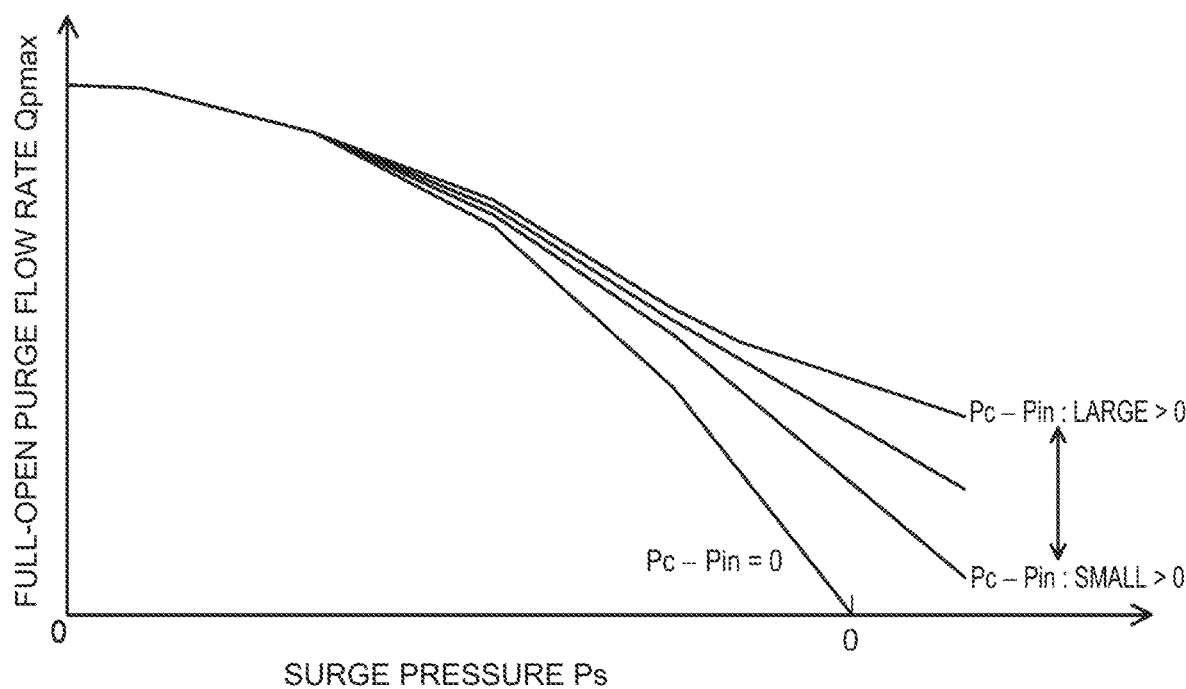
FIG. 15 is a graph showing one example of a full-open purge flow rate estimation map.

Then, the electronic control unit 70 estimates a full-open purge flow rate Qpmax based on the surge pressure Ps and the value obtained by subtracting the intake air pressure Pin from the supercharging pressure Pc (step S430). The full-open purge flow rate Qpmax is a purge flow rate (the volume flow rate of the evaporated fuel gas supplied to the intake pipe 23) when the driving duty of the purge control valve 65 is set to 100%. The full-open purge flow rate Qpmax can be obtained by applying the surge pressure Ps and the value obtained by subtracting the intake air pressure Pin from the supercharging pressure Pc to a full-open purge flow rate estimation map. The full-open purge flow rate estimation map is specified in advance by experiment or analysis as a relationship among the surge pressure Ps, the value obtained by subtracting the intake air pressure Pin from the supercharging pressure Pc, and the full-open purge flow rate Qpmax, and is stored in the ROM or the flash memory (not shown). FIG. 15 is a graph showing one example of the full-open purge flow rate estimation map. As shown in this graph, the full-open purge flow rate Qpmax is set so as to increase as the surge pressure Ps decreases (as the absolute value thereof as a negative value increases) and as the value obtained by subtracting the intake air pressure Pin from the supercharging pressure Pc increases.

Subsequently, the electronic control unit 70 estimates a combustion chamber air amount Qcc that is an amount of air inside the combustion chamber 30 based on the intake air amount Qa and a pre-valve purge flow rate at a point that is the predetermined time T2 earlier (past Qpv) (step S440). The pre-valve purge flow rate Qpv is the flow rate of the evaporated fuel gas in the common passage 61, on the side of the introduction passage 52 relative to the purge control valve 65. As the pre-valve purge flow rate at the point that is the predetermined time T2 earlier (past Qpv), a value estimated by the process of step S490, to be described later, during execution of this routine at the point that is the predetermined time T2 earlier is used when the purge was being executed at the point that is the predetermined time T2 earlier, and zero is used when the purge was not being executed at the point that is the predetermined time T2 earlier. The predetermined time T2 is specified as a time taken for the evaporated fuel gas in the common passage 61, on the side of the introduction passage 52 relative to the purge control valve 65, to reach the combustion chamber 30. As the predetermined time T2, a time based on the dominant purge flag Fpd, the upstream purge inference flag Fpup, the speed Ne of the engine 12, or the like may be used, or a fixed time may be used for convenience. The combustion chamber air amount Qcc can be obtained by, for example, applying the intake air amount Qa and the past pre-valve purge flow rate (past Qpv) to a combustion chamber air amount estimation map. The combustion chamber air amount estimation map is specified in advance by experiment or analysis as a relationship of the intake air amount Qa and the past pre-valve purge flow rate (past Qpv) to the combustion chamber air amount Qcc, and is stored in the ROM or the flash memory (not shown).

When the full-open purge flow rate Qpmax and the combustion chamber air amount Qcc are thus estimated, the electronic control unit 70 estimates a full-open purge ratio Rpmax based on these flow rate and amount (step S450). The full-open purge ratio Rpmax can be calculated by dividing the full-open purge flow rate Qpmax by the combustion chamber air amount Qcc. Subsequently, the electronic control unit 70 sets a required purge ratio Rprq by limiting (setting an upper limit on) the target purge ratio Rptg with the full-open purge ratio Rpmax and the upper limit purge ratio Rplim (step S460). Specifically, the electronic control unit 70 sets the smallest value of the target purge ratio Rptg, the full-open purge ratio Rpmax, and the upper limit purge ratio Rplim as the required purge ratio Rprq. Then, the electronic control unit 70 sets the required duty Drq of the purge control valve 65 by dividing the required purge ratio Rprq by the full-open purge ratio Rpmax (step S470), and controls the purge control valve 65 using the set required duty Drq (step S480).

Then, the electronic control unit 70 estimates the pre-valve purge flow rate Qpv based on the intake air amount Qa and the required purge ratio Rprq (step S490), and ends this routine. The pre-valve purge flow rate Qpv can be obtained by, for example, applying the intake air amount Qa and the required purge ratio Rprq to a pre-valve purge flow rate estimation map. The pre-valve purge flow rate estimation map is specified by experiment or analysis as a relationship of the intake air amount Qa and the required purge ratio Rprq to the pre-valve purge flow rate Qpv, and is stored in the ROM or the flash memory (not shown).

Thus, in the embodiment, the target purge ratio Rptg (at least one of the starting purge ratio Rpst1, the resumed purge ratio Rpst2, and the rate values ΔRp1, ΔRp2) and the upper limit purge ratio Rplim are varied according to which of the natural aspiration region and the supercharging region applies. In the supercharging region (a region of a large intake air amount Qa or a high load ratio KL), the fuel injection control (front air-fuel ratio AF1) is more likely to become unstable during execution of the purge than in the natural aspiration region (a region of a small intake air amount Qa or a low load ratio KL) due to the lower reliability of the air-fuel ratio correction amount α, the lower reliability of the purge concentration-related value Cp attributable thereto, fluctuations of the supercharging pressure Pc, and other factors. Reducing the target purge ratio Rptg and the upper limit purge ratio Rplim can reduce the likelihood that the front air-fuel ratio AF1 may become unstable under the fuel injection control. In the embodiment, the load ratio region Rk [n] that is a wide region is specified by experiment or analysis so as to correspond to some extent to the supercharging region.

Figure 16:
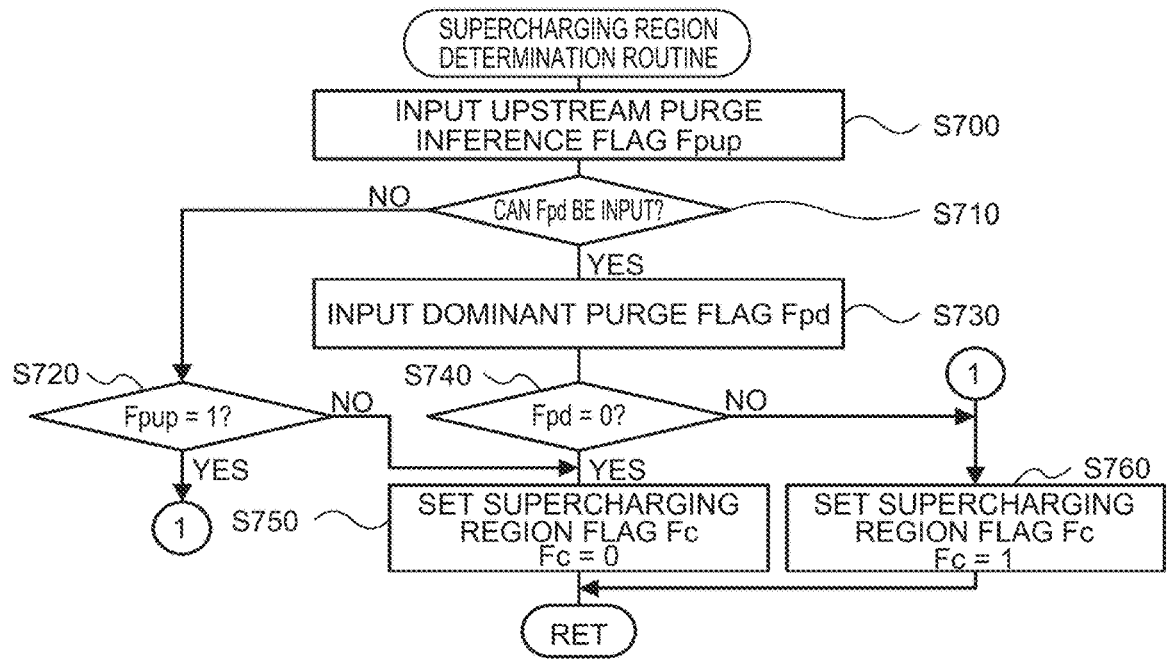
FIG. 16 is a flowchart showing one example of a supercharging region determination routine.

Next, the process of step S402 in the purge control routine of FIG. 9, particularly, the process of determining which of the natural aspiration region and the supercharging region applies (the process of setting the supercharging region flag Fc) will be described. FIG. 16 is a flowchart showing one example of a supercharging region determination routine for determining which of the natural aspiration region and the supercharging region applies. When this routine is executed, the electronic control unit 70 first inputs data including the upstream purge inference flag Fpup (step S700). As the upstream purge inference flag Fpup, a value set by the upstream purge inference routine of FIG. 11 is input.

Subsequently, the electronic control unit 70 determines whether the dominant purge flag Fpd can be input (step S710). This process is performed by, for example, determining whether the dominant purge flag Fpd is set by the dominant purge determination routine of FIG. 10 after meeting of the purge conditions is started or resumed (after the value of the purge condition flag Fpc is switched from zero to one).

When it is determined in step S710 that the dominant purge flag Fpd cannot be input, the electronic control unit 70 checks the value of the upstream purge inference flag Fpup (step S720). When the value of the upstream purge inference flag Fpup is zero, i.e., when it is inferred that the purge does not include the upstream purge (consists only of the downstream purge), the electronic control unit 70 determines that the natural aspiration region applies, sets the value of the supercharging region flag Fc to zero (step S750), and ends this routine. When the value of the upstream purge inference flag Fpup is one, i.e., it is inferred that the purge includes the upstream purge, the electronic control unit 70 determines that the supercharging region applies, sets the value of the supercharging region flag Fc to one (step S760), and ends this routine.

When it is determined in step S710 that the dominant purge flag Fpd can be input, the electronic control unit 70 inputs the dominant purge flag Fpd (step S730) and checks the value of the dominant purge flag Fpd (step S740). As the dominant purge flag Fpd, a value set by the dominant purge determination routine of FIG. 10 is input. When the value of the dominant purge flag Fpd is zero, i.e., when the downstream purge is the dominant purge, the electronic control unit 70 determines that the natural aspiration region applies, sets the value of the supercharging region flag Fc to zero (step S750), and ends this routine. When the value of the dominant purge flag Fpd is one, i.e., when the upstream purge is the dominant purge, the electronic control unit 70 determines that the supercharging region applies, sets the value of the supercharging region flag Fc to one (step S760), and ends this routine.

Thus, in the embodiment, when the purge is started or resumed (when the dominant purge flag Fpd cannot be input), it is determined which of the natural aspiration region and the supercharging region applies (the supercharging region flag Fc is set) based on the upstream purge inference flag Fpup, whereas when the purge is being executed (the dominant purge flag Fpd can be input), it is determined which of the natural aspiration region and the supercharging region applies based on the dominant purge flag Fpd. In this way, also when the dominant purge flag Fpd cannot be input, which of the natural aspiration region and the supercharging region applies can be determined, and when the purge is being executed, which of the natural aspiration region and the supercharging region applies can be more appropriately determined.

Figure 17:
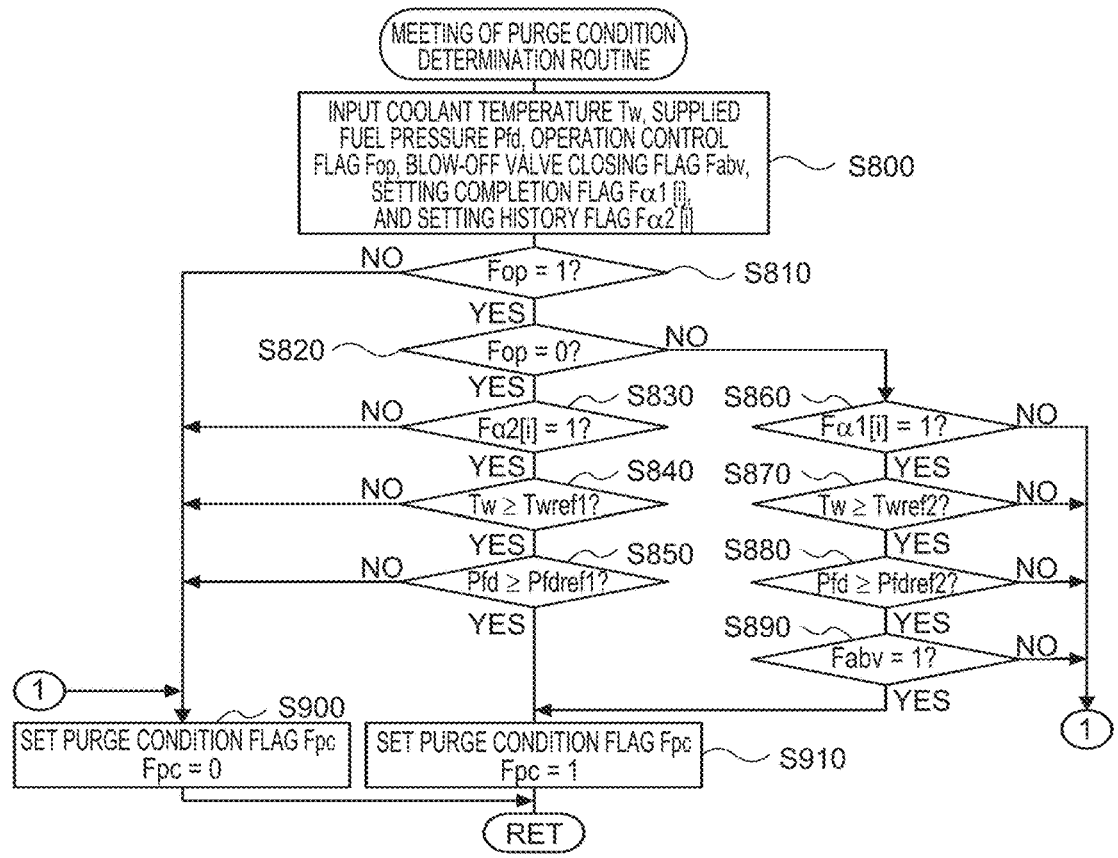
FIG. 17 is a flowchart showing one example of a meeting of purge condition determination routine.

Next, the process of step S404 in the purge control routine of FIG. 9, particularly, the process of determining whether the purge conditions are met (the process of setting the purge condition flag Fpc) will be described. FIG. 17 is a flowchart showing one example of the meeting of purge condition determination routine for determining whether the purge conditions are met. When this routine is executed, the electronic control unit 70 first inputs data including the coolant temperature Tw and the supplied fuel pressure Pfd of the engine 12, the operation control flag Fop, the blow-off valve closing flag Fabv, and the setting completion flag F$\alpha$1 [i] and the setting history flag F$\alpha$2 [i] for the corresponding region (region number i) (step S800).

As the coolant temperature Tw, a value detected by the coolant temperature sensor 16 is input. As the supplied fuel pressure Pfd, a value detected by the fuel pressure sensor 28a is input. As the operation control flag Fop, a value set by an operation control determination routine (not shown) is input. In the operation control determination routine, the electronic control unit 70 sets the value of the operation control flag Fop to one when operation control (such as the fuel injection control) of the engine 12 is being performed, and sets the value of the operation control flag Fop to zero when the operation control of the engine 12 is not being performed (e.g., when the operation control is interrupted). Examples of the case where the operation control of the engine 12 is not being performed include a case where fuel cut-off of the engine 12 is performed by releasing the accelerator while the vehicle equipped with the engine device 10 is traveling. As the blow-off valve closing flag Fabv, a value set by a blow-off valve opening or closing determination routine (not shown) is input. In the blow-off valve opening or closing determination routine, the electronic control unit 70 sets the value of the blow-off valve closing flag Fabv to one when the blow-off valve 45 is closed, and sets the value of the blow-off valve closing flag Fabv to zero when the blow-off valve 45 is open. As the setting completion flag F$\alpha$1 and the setting history flag F$\alpha$2, values set by the air-fuel ratio correction amount setting routine of FIG. 5 are input.

Subsequently, the electronic control unit 70 checks the value of the operation control flag Fop (step S810). When the value of the operation control flag Fop is zero, i.e., when the operation control of the engine 12 is not being performed, the electronic control unit 70 determines that the purge conditions are not met, sets the value of the purge condition flag Fpc to zero (step S900), and ends this routine.

When the value of the operation control flag Fop is one in step S810, i.e., when the operation control of the engine 12 is being performed, the electronic control unit 70 checks the value of the supercharging region flag Fc set in step S402 of the purge control routine of FIG. 9 (the supercharging region determination routine of FIG. 16) (step S820). When the value of the supercharging region flag Fc is zero, i.e., when it is determined that the natural aspiration region applies, the electronic control unit 70 determines whether the value of the setting history flag F$\alpha$2 [i] for the corresponding region (region number i) is one, i.e., whether there is a setting history of the air-fuel ratio correction amount $\alpha$ [i] (step S830); whether the coolant temperature Tw is not lower than a threshold value Twref1 (step S840); and whether the supplied fuel pressure Pfd of the cylinder injection valve 28 is not lower than a threshold value Pfdref1 (step S850). As the threshold value Twref1, for example, a value lower than the threshold value Twref (see step S230 of the air-fuel ratio correction amount setting routine of FIG. 5) by about 10° C. to 20° C. is used. As the threshold value Pfdref1, for example, a value of about 2 kPa to 5 kPa is used.

When the value of the setting history flag F$\alpha$2 [i] for the corresponding region (region number i) is zero in step S830, i.e., when there is no setting history of the air-fuel ratio correction amount $\alpha$ [i], or when the coolant temperature Tw is lower than the threshold value Twref1 in step S840, or when the supplied fuel pressure Pfd is lower than the threshold value Pfdref1 in step S850, the electronic control unit 70 determines that the purge conditions are not met, sets the value of the purge condition flag Fpc to zero (step S900), and ends this routine.

When the value of the setting history flag F$\alpha$2 [i] for the corresponding region (region number i) is one in step S830, i.e., there is a setting history of the air-fuel ratio correction amount $\alpha$ [i], and the coolant temperature Tw is not lower than the threshold value Twref1 in step S840, and the supplied fuel pressure Pfd is not lower than the threshold value Pfdref1 in step S850, the electronic control unit 70 determines that the purge conditions are met, sets the value of the purge condition flag Fpc to one (step S910), and ends this routine.

When the value of the supercharging region flag Fc is one in step S820, i.e., when it is determined that the supercharging region applies, the electronic control unit 70 determines whether the value of the setting completion flag F$\alpha$1 [i] for the corresponding region (region number i) is one, i.e., whether the air-fuel ratio correction amount $\alpha$ [i] has been set in the current trip (step S860); whether the coolant temperature Tw is not lower than a threshold value Twref2 that is higher than the threshold value Twref1 (step S870); whether the supplied fuel pressure Pfd of the cylinder injection valve 28 is not lower than a threshold value Pfdref2 that is higher than the threshold value Pfdref1 (step S880); and whether the value of the blow-off valve closing flag Fabv is one, i.e., whether the blow-off valve 45 is closed (step S890). As the threshold value Twref2, for example, a value higher than the threshold value Twref1 by about 25° C. to 35° C. is used. As the threshold value Pfdref2, for example, a value of about 10 kPa to 15 kPa is used.

When the value of the setting completion flag F$\alpha$1 [i] for the corresponding region (region number i) is zero in step S860, i.e., the air-fuel ratio correction amount $\alpha$ [i] has not been set in the current trip, or when the coolant temperature Tw is lower than the threshold value Twref2 in step S870, or when the supplied fuel pressure Pfd of the cylinder injection valve 28 is lower than the threshold value Pfdref2 in step S880, or when the value of the blow-off valve closing flag Fabv is zero in step S890, i.e., the blow-off valve 45 is open, the electronic control unit 70 determines that the purge conditions are not met, sets the value of the purge condition flag Fpc to zero (step S900), and ends this routine.

When the value of the setting completion flag F$\alpha$1 [i] for the corresponding region (region number i) is one in step S860, i.e., the air-fuel ratio correction amount $\alpha$ [i] has been set in the current trip, and the coolant temperature Tw is not lower than the threshold value Twref2 in step S870, and the supplied fuel pressure Pfd of the cylinder injection valve 28 is not lower than the threshold value Pfdref2 in step S880, and the value of the blow-off valve closing flag Fabv is one in step S890, i.e., the blow-off valve 45 is closed, the electronic control unit 70 determines that the purge conditions are met, sets the value of the purge condition flag Fpc to one (step S910), and ends this routine.

As described above, the reliability of the air-fuel ratio correction amount $\alpha$ [n] for the load ratio region Rk [n] of the highest load ratio of the load ratio regions Rk [1] to Rk [n−1] is lower than the reliabilities for the other load ratio regions Rk [1] to Rk [n−1]. The reliability of the air-fuel ratio correction amount $\alpha$ [i] for the corresponding region (region number i) is lower when the air-fuel ratio correction amount $\alpha$ [i] has not been set in the current trip than when this has been set. Further, when the reliability of the air-fuel ratio correction amount $\alpha$ [i] for the corresponding region is low, controlling the cylinder injection valve 28 by setting the required injection amount Qf* using this air-fuel ratio correction amount α [i] is likely to result in variations (errors) in the front air-fuel ratio AF1 and variations in the purge concentration-related value Cp. Variations in the purge concentration-related value Cp in turn cause variations in the purge correction amount β, so that controlling the cylinder injection valve 28 by setting the required injection amount Qf* using the air-fuel ratio correction amount α [i] and the purge correction amount β is likely to result in greater variations in the front-air fuel ratio AF1. In addition, in the upstream purge, the front air-fuel ratio AF1 is more likely to become unstable under the fuel injection control during execution of the purge than in the downstream purge due to the long route by which the evaporated fuel gas reaches the surge tank 27, the long time taken for the evaporated fuel gas to reach the surge tank 27, fluctuations in the supercharging pressure Pc, and other factors. With these factors taken into account, in the embodiment, when it is determined that the natural aspiration region applies, the condition that there is a setting history of the air-fuel ratio correction amount α [i] for the corresponding region (the condition that the value of the setting history flag Fα2 [i] is one) is used as one of the purge conditions, whereas when it is determined that the supercharging region applies, the condition that the air-fuel ratio correction amount α [i] for the corresponding region has been set in the current trip (the condition that the value of the setting completion flag Fa is one) is used as one of the purge conditions. This means that when it is determined that the supercharging region applies, a more stringent condition is used at least as the condition for the presence or absence of setting of the air-fuel ratio correction amount α [i] among the purge conditions than when it is determined that the natural aspiration region applies. Thus, when it is determined that the supercharging region applies, fluctuations in the air-fuel ratio of the engine 12 can be reduced.

The air-fuel ratio of the engine 12 is more likely to fluctuate when the engine 12 is cold (before completion of warming up) than when it is hot (after completion of warming up). The reliability of the air-fuel ratio correction amount α [n] for the load ratio region Rk [n] among the load ratio regions Rk [1] to Rk [n] is lower than the reliabilities for the other load ratio regions Rk [1] to Rk [n−1]. With these and other facts taken into account, in the embodiment, when it is determined that the natural aspiration region applies, the condition that the coolant temperature Tw is not lower than the threshold value Twref1 is used as one of the purge conditions, whereas when it is determined that the supercharging region applies, the condition that the coolant temperature Tw is not lower than the threshold value Twref2, higher than the threshold value Twref1, is used as one of the purge conditions. This means that when it is determined that the supercharging region applies, a more stringent condition is used at least as the condition for the coolant temperature Tw among the purge conditions than when it is determined that the natural aspiration region applies. Thus, when it is determined that the supercharging region applies, fluctuations in the air-fuel ratio of the engine 12 can be reduced.

Further, in the supercharging region, the temperature of the combustion chamber 30 is more likely to become high and deposits are more likely to adhere to the cylinder injection valve 28 than in the natural aspiration region, as air pressurized by the compressor 41 of the turbocharger 40 is suctioned into the combustion chamber 30. With this taken into account, in the embodiment, when it is determined that the natural aspiration region applies, the condition that the supplied fuel pressure Pfd of the cylinder injection valve 28 is not lower than the threshold value Pfdref1 is used as one of the purge conditions, whereas when it is determined that the supercharging region applies, the condition that the supplied fuel pressure Pfd of the cylinder injection valve 28 is not lower than the threshold value Pfdref2, higher than the threshold value Pfdref1, is used as one of the purge conditions. This means that when it is determined that the supercharging region applies, a more stringent condition is used at least as the condition for the supplied fuel pressure Pfd of the cylinder injection valve 28 among the purge conditions than when it is determined that the natural aspiration region applies. The higher the supplied fuel pressure Pfd of the cylinder injection valve 28 is, the less likely it is that deposits will adhere to the cylinder injection valve 28 (the more likely it is that adhering deposits, if any, will be blown off). Thus, when it is determined that the supercharging region applies, deposits adhering to the cylinder injection valve 28 can reduced.

When the upstream purge is executed while the blow-off valve 45 of the turbocharger 40 is open, the estimated value of the full-open purge flow rate Qpmax deviates farther from the actual value as part of the evaporated fuel gas supplied to the intake pipe 23, upstream of the compressor 41, circulates through the bypass pipe 24, which may make it impossible to appropriately perform the purge control. With this taken into account, in the embodiment, when it is determined that the supercharging region applies, the condition that the blow-off valve 45 is closed (the condition that the value of the blow-off valve closing flag Fabv is one) is used as one of the purge conditions. This can reduce the likelihood that part of the evaporated fuel gas supplied to the intake pipe 23, upstream of the compressor 41, by the upstream purge may circulate through the bypass pipe 24.

In the engine device 10 of the embodiment having been described above, when it is determined that the natural aspiration region applies, the condition that there is a setting history of the air-fuel ratio correction amount c for the corresponding region is used as one of the purge conditions, whereas when it is determined that the supercharging region applies, the condition that the air-fuel ratio correction amount c for the corresponding region has been set in the current trip is used as one of the purge conditions. This means that when it is determined that the supercharging region applies, a more stringent condition is used at least as the condition for the presence or absence of setting of the air-fuel ratio correction amount c among the purge conditions than when it is determined that the natural aspiration region applies. Thus, when it is determined that the supercharging region applies, fluctuations in the air-fuel ratio of the engine 12 can be reduced.

In the engine device 10 of the embodiment, when it is determined that the supercharging region applies, not only is a more stringent condition used at least as the condition for the presence or absence of setting of the air-fuel ratio correction amount c among the purge conditions than when it is determined that the natural aspiration region applies, but also more stringent conditions for the coolant temperature Tw and the supplied fuel pressure Pfd of the cylinder injection valve 28 are used and the condition that the blow-off valve 45 is closed are used. However, the same condition for the coolant temperature Tw may be used when it is determined that the natural aspiration region applies and when it is determined that the supercharging region applies. Further, the same condition for the supplied fuel pressure Pfd of the cylinder injection valve 28 may be used when it is determined that the natural aspiration region applies and when it is determined that the supercharging region applies.

In addition, the condition that the blow-off valve 45 is closed does not have to be used when it is determined that the supercharging region applies.

Figure 18:
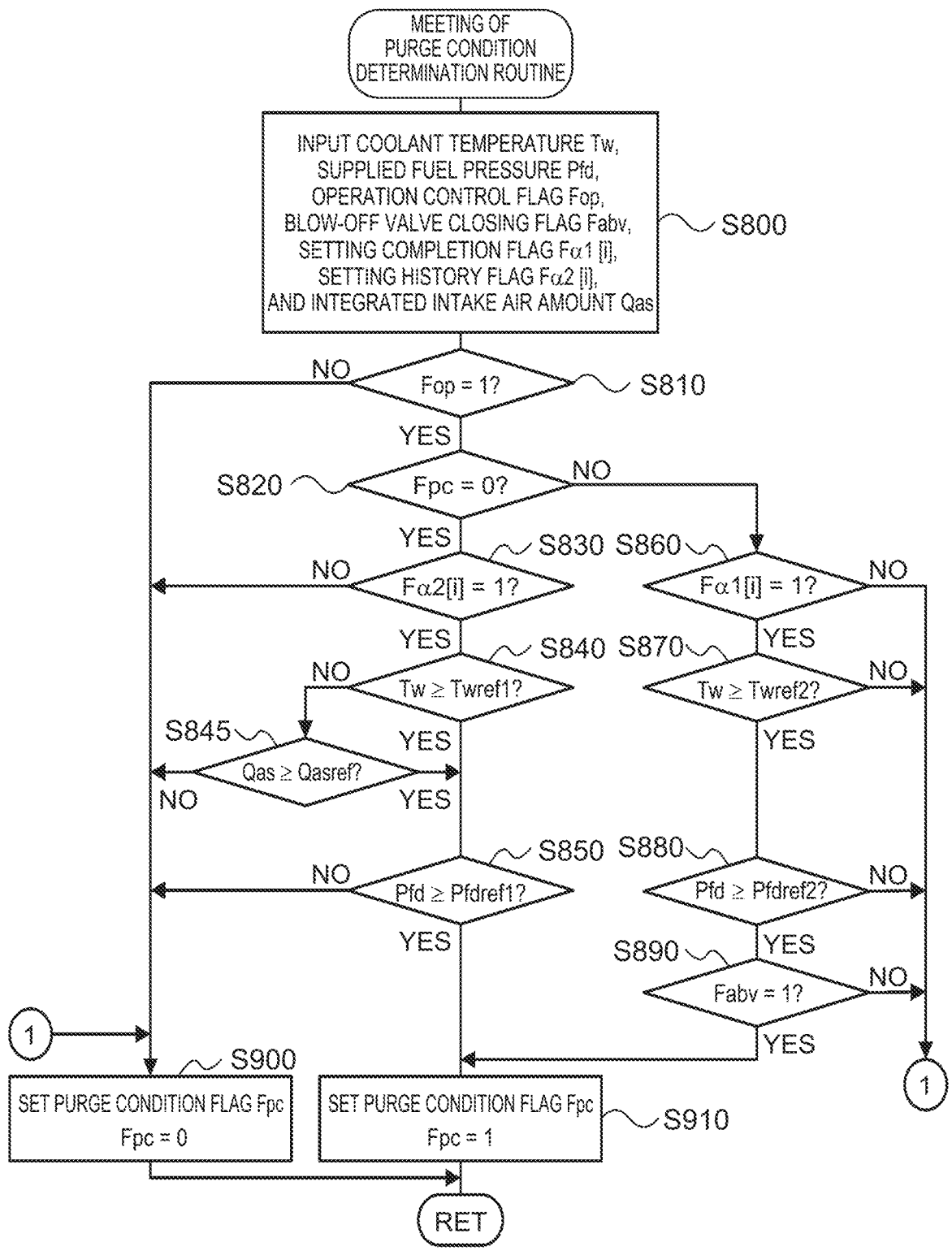
FIG. 18 is a flowchart showing one example of a meeting of purge condition determination routine.

In the engine device 10 of the embodiment, the electronic control unit 70 executes the meeting of purge condition determination routine of FIG. 17. Instead of this, the meeting of purge condition determination routine of FIG. 18 may be executed. The routine of FIG. 18 is the same as the routine of FIG. 17, except that the process of step S800 is replaced with the process of step S810 and that the process of step S825 is added. Therefore, those processes in the routine of FIG. 18 that are the same as in the routine of FIG. 17 will be denoted by the same step numbers and a detailed description thereof will be omitted.

In the meeting of purge condition determination routine of FIG. 18, the electronic control unit 70 first inputs an integrated intake air amount Qas (step S810), in addition to inputting the coolant temperature Tw, the supplied fuel pressure Pfd, the blow-off valve closing flag Fabv, and the setting completion flag Fα1 [i] and the setting history flag Fα2 [i] for the corresponding region (region number i) as in step S800 of the meeting of purge condition determination routine of FIG. 17. As the integrated intake air amount Qas, a value calculated as an integrated value of the intake air amounts Qa from the start of the engine 12 is input.

When the coolant temperature Tw is lower than the threshold value Twref1 in step S840, the electronic control unit 70 compares the integrated intake air amount Qas with a threshold value Qasref (step S845). The threshold value Qasref is specified in advance by experiment or analysis as an integrated intake air amount Qas with which the coolant temperature Tw is assumed to have become equal to or higher than the threshold value Twref1 if the coolant temperature sensor 16 is normal. When the integrated intake air amount Qas is smaller than the threshold value Qasref, the electronic control unit 70 determines that the purge conditions are not met, sets the value of the purge condition flag Fpc to zero (step S900), and ends this routine. When the integrated intake air amount Qas is not smaller than the threshold value Qasref, the electronic control unit 70 executes the processes of step S850 and the subsequent steps. Thus, when it is determined that the natural aspiration region applies, the purge can be sometimes executed even if the coolant temperature Tw does not become equal to or higher than the threshold value Twref1 due to abnormality of the coolant temperature sensor 16. On the other hand, when it is determined that the supercharging region applies, and the coolant temperature Tw is lower than the threshold value Twref2, the condition of the integrated intake air amount Qas is not used, because, as described above, the air-fuel ratio of the engine 12 is more likely to fluctuate than when it is determined that the natural aspiration region applies.

In the engine device 10 of the embodiment, when the purge is started or resumed (when the dominant purge flag Fpd cannot be input), it is determined which of the natural aspiration region and the supercharging region applies (the supercharging region flag Fc is set) based on the upstream purge inference flag Fpup, whereas when the purge is being executed (the dominant purge flag Fpd can be input), it is determined which of the natural aspiration region and the supercharging region applies based on the dominant purge flag Fpd. However, which of the natural aspiration region and the supercharging region applies may be determined based on the upstream purge inference flag Fpup also when the purge is being executed.

In the engine device 10 of the embodiment, the offset amount kd is set based on the surge pressure Ps, and which of the downstream purge and the upstream purge is the dominant purge is determined based on the ejector relative pressure Pej and the value obtained by subtracting the offset amount kd from the surge pressure Ps. However, which of the downstream purge and the upstream purge is the dominant purge may be determined based on the ejector relative pressure Pej and a value obtained by subtracting a fixed offset amount kd that is not related to the surge pressure Ps from the surge pressure Ps. Also in this case, which of the downstream purge and the upstream purge is the dominant purge can be determined, albeit with less accuracy than in the embodiment, more appropriately than when the influence based on the cross-sectional area of the second purge passage relative to the cross-sectional area of the first purge passage 62 is not taken into account.

In the engine device 10 of the embodiment, the target purge ratio Rptg (at least one of the starting purge ratio Rpst1, the resumed purge ratio Rpst2, and the rate values ΔRp1, ΔRp2) and the upper limit purge ratio Rplim are varied according to which of the natural aspiration region and the supercharging region applies. However, only one of the target purge ratio Rptg and the upper limit purge ratio Rplim may be varied according to which of the natural aspiration region and the supercharging region applies. Alternatively, other parameter than the target purge ratio Rptg and the upper limit purge ratio Rplim that is related to control of the purge control valve 65 may be varied.

In the engine device 10 of the embodiment, the air-fuel ratio correction amounts α [1] to α [n] for the respective load ratio regions Rk [1] to Rk [n] are set only once during one trip. However, the air-fuel ratio correction amounts α [1] to α [n] may be set several times during one trip. In this case, the process of step S250 in the air-fuel ratio correction amount setting routine of FIG. 5 does not have to be executed.

In the engine device 10 of the embodiment, the range assumed for the load ratio KL is divided into the load ratio regions Rk to Rk [n], and the air-fuel ratio correction amounts α [1] to α [n] for the respective load ratio regions Rk [1] to Rk [n] are set. Instead of this, a range assumed for the intake air amount Qa may be divided into a plurality of air amount regions Rq [1] to Rq [n], and the air-fuel ratio correction amounts α [1] to α [n] for the respective air amount regions Rq [1] to Rq [n] may be set.

In the engine device 10 of the embodiment, which of the downstream purge and the upstream purge is the dominant purge is determined based on the ejector relative pressure Pej and the value obtained by subtracting the offset amount kd from the surge pressure Ps. However, which of the downstream purge and the upstream purge is the dominant purge may be determined based on the load ratio KL or the intake air amount Qa. In this case, which of the downstream purge and the upstream purge is the dominant purge may be determined based on the load ratio KL and a value at the border between the load ratio region Rk [n−1] and the load ratio region Rk [n], or which of the downstream purge and the upstream purge is the dominant purge may be determined based on the intake air amount Qa and a value at the border between the air amount region Rq [n−1] and the air amount region Rq [n].

In the engine device 10 of the embodiment, the engine 12 includes the cylinder injection valve 28 that injects fuel into the combustion chamber 30. However, in addition to or in place of the cylinder injection valve 28, the engine 12 may include a port injection valve that injects fuel into an intake port.

In the engine device 10 of the embodiment, the turbocharger 40 is configured as a turbocharger in which the compressor 41 disposed in the intake pipe 23 and the turbine 42 disposed in the exhaust pipe 35 are coupled to each other through the rotating shaft 43. Instead of this, the turbocharger 40 may be configured as a supercharger in which a compressor driven by the engine 12 or a motor is disposed in the intake pipe 23.

In the engine device 10 of the embodiment, the common passage 61 is connected to the introduction passage 52, near the canister 56, in the evaporated fuel processing device 50. However, the common passage 61 may be connected to the canister 56.

In the embodiment, the engine device has the form of the engine device 10 that is installed in ordinary cars or various types of hybrid cars. However, the engine device may have the form of an engine device that is installed in vehicles other than cars, or may have the form of an engine device that is installed in stationary equipment, such as construction equipment.

Correspondence relationships between the main elements of the embodiment and the main elements described in the section SUMMARY are as follows: In the embodiment, the engine 12 corresponds to the "engine"; the turbocharger 40 corresponds to the "turbocharger"; the evaporated fuel processing device 50 corresponds to the "evaporated fuel processing device"; and the electronic control unit 70 corresponds to the "controller."

Since the embodiment is one example for specifically describing the mode for carrying out the present disclosure described in the section SUMMARY, those correspondence relationships between the main elements of the embodiment and the main elements described in the section SUMMARY do not limit the elements of the present disclosure described therein. Thus, the present disclosure described in the section SUMMARY should be interpreted based on the description in that section, and the embodiment is merely one specific example of the present disclosure described in that section.

While the mode for carrying out the present disclosure has been described above using the embodiment, it should be understood that the present disclosure is in no way limited by such an embodiment but can be implemented in various modes within the scope of the gist of the present disclosure.

The present disclosure can be used in the engine device manufacturing industry and the like.

What is claimed is:

1. An engine device installed in a vehicle, the engine device comprising:
    an engine that has a throttle valve disposed in an intake pipe and a fuel injection valve, and outputs power using fuel supplied from a fuel tank;
    an air-fuel ratio sensor mounted on an exhaust pipe of the engine;
    a turbocharger having a compressor disposed in the intake pipe, upstream of the throttle valve;
    an evaporated fuel processing device having
        a supply passage that splits into a first purge passage and a second purge passage that are connected to the intake pipe and supplies an evaporated fuel gas containing evaporated fuel generated inside the fuel tank to the intake pipe,
        an ejector having an intake port connected to a circulation passage extending from the intake pipe, between the compressor and the throttle valve, an exhaust port connected to the intake pipe, upstream of the compressor, and a suction port connected to the second purge passage, and
        a purge control valve provided in the supply passage; and
    a controller, wherein:
    the controller executes fuel injection control of the engine by setting a required injection amount using a required load ratio of the engine and an air-fuel ratio correction amount that is related to deviation of the air-fuel ratio sensor;
    when setting conditions are met, the controller sets the air-fuel ratio correction amount for a corresponding region to which a current intake air amount or load ratio of the engine belongs among a plurality of regions into which a range of the intake air amount or the load ratio of the engine is divided such that a region of a larger intake air amount or a higher load ratio becomes wider than a region of a smaller intake air amount or a lower load ratio;
    when purge conditions are met, the controller controls the purge control valve by setting a driving duty of the purge control valve such that purge of supplying the evaporated fuel gas to the intake pipe is executed based on a required purge ratio; and
    in a natural aspiration region, the purge conditions include a condition that there is a setting history of the air-fuel ratio correction amount for the corresponding region, and in a supercharging region, the purge conditions include a condition that the air-fuel ratio correction amount for the corresponding region has been set in a current trip.

2. The engine device according to claim 1, wherein:
    the controller executes the fuel injection control by setting the required injection amount using the required load ratio, the air-fuel ratio correction amount, and a purge correction amount that is based on a purge concentration-related value related to a concentration of the evaporated fuel gas; and
    when the purge is being executed, the controller sets the purge concentration-related value based on deviation of an air-fuel ratio detected by the air-fuel ratio sensor from a required air-fuel ratio.

3. The engine device according to claim 1, wherein, in the natural aspiration region, the purge conditions include a condition that a temperature of the engine is not lower than a first predetermined temperature, and in the supercharging region, the purge conditions include a condition that the temperature of the engine is not lower than a second predetermined temperature that is higher than the first predetermined temperature.

4. The engine device according to claim 3, wherein, in the natural aspiration region, the purge conditions include conditions that the temperature of the engine is lower than the first predetermined temperature and that an integrated value of the intake air amount is not smaller than a predetermined air amount.

5. The engine device according to claim 1, wherein:
    the fuel injection valve is a cylinder injection valve mounted on a combustion chamber of the engine; and
    in the natural aspiration region, the purge conditions include a condition that a pressure of fuel supplied by the cylinder injection valve is not lower than a first predetermined fuel pressure, and in the supercharging region, the purge conditions include a condition that the supplied fuel pressure is not lower than a second predetermined fuel pressure that is higher than the first predetermined fuel pressure.

6. The engine device according to claim 1, wherein:
the turbocharger has a blow-off valve provided in a bypass pipe that connects two points in the intake pipe, upstream and downstream of the compressor, to each other; and
in the supercharging region, the purge conditions include a condition that the blow-off valve is closed.

7. The engine device according to claim 1, wherein:
the controller performs an inference process in which, when a post-throttle-valve pressure that is a pressure inside the intake pipe, downstream of the throttle valve, is lower than a threshold value, the controller infers that the purge does not include second purge of supplying the evaporated fuel gas to the intake pipe through the second purge passage, and when the post-throttle-valve pressure is not lower than the threshold value, the controller infers that the purge includes the second purge, and in this inference process, when the post-throttle-valve pressure equal to or higher than the threshold value falls below the threshold value, the controller continues to infer that the purge includes the second purge until a predetermined time elapses;
when the purge is being executed, the controller estimates an ejector relative pressure that is a pressure at the suction port of the ejector, based on a pressure difference between a supercharging pressure that is a pressure inside the intake pipe, between the compressor and the throttle valve, and a pre-compressor pressure that is a pressure inside the intake pipe, upstream of the compressor, and on the driving duty, and then based on the ejector relative pressure and the post-throttle-valve pressure, determines a dominant purge that is a dominant one of the first purge and the second purge; and
when the purge is started or resumed, the controller determines which of the natural aspiration region and the supercharging region applies based on an inference of whether the purge includes the second purge, and when the purge is being executed, the controller determines which of the natural aspiration region and the supercharging region applies based on the dominant purge.

8. The engine device according to claim 7, wherein the controller determines the dominant purge based on the ejector relative pressure and a value that is the post-throttle-valve pressure allowing for an offset amount based on a cross-sectional area of the second purge passage relative to a cross-sectional area of the first purge passage.

* * * * *